(12) United States Patent
Kakinoki et al.

(10) Patent No.: US 11,650,677 B2
(45) Date of Patent: May 16, 2023

(54) INPUT DETECTION SYSTEM AND DETECTION DEVICE

(71) Applicant: Japan Display Inc., Tokyo (JP)

(72) Inventors: Yuto Kakinoki, Tokyo (JP); Makoto Hayashi, Tokyo (JP); Takaaki Kono, Tokyo (JP); Takayuki Nakanishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/850,345

(22) Filed: Jun. 27, 2022

(65) Prior Publication Data

US 2022/0413631 A1    Dec. 29, 2022

(30) Foreign Application Priority Data

Jun. 29, 2021 (JP) .............................. JP2021-107451

(51) Int. Cl.
*G06F 3/0362* (2013.01)
*G06F 3/044* (2006.01)

(52) U.S. Cl.
CPC .......... *G06F 3/0362* (2013.01); *G06F 3/0443* (2019.05)

(58) Field of Classification Search
CPC .............................. G06F 3/0362; G06F 3/0443
See application file for complete search history.

(56) References Cited

U.S. PATENT DOCUMENTS

| 11,269,470 B2 | 3/2022 | Mori et al. |
| 2018/0018028 A1* | 1/2018 | Lee ........................ G06F 3/0383 |
| 2021/0232269 A1 | 7/2021 | Sasaki et al. |

FOREIGN PATENT DOCUMENTS

| JP | 6342105 A | 5/2018 |
| JP | 6532631 A | 5/2019 |

* cited by examiner

*Primary Examiner* — Hang Lin
(74) *Attorney, Agent, or Firm* — K&L Gates LLP

(57) ABSTRACT

An input detection system includes a detection device including a plurality of drive electrodes and a plurality of detection electrodes arrayed in a detection region, and a drive electrode scan circuit configured to supply a drive signal to the drive electrodes, and an input device including an LC circuit, a first electrode coupled to one end side of the LC circuit, and a second electrode coupled to the other end side of the LC circuit. The drive electrode scan circuit supplies the drive signal to at least equal to or more than one of the drive electrodes and supplies, to the others of the drive electrodes, an opposite phase signal as a drive signal having an opposite phase to a phase of the drive signal.

9 Claims, 23 Drawing Sheets

(TABLE 1)

| EN | VCOMSEL | Vout |
|---|---|---|
| H | H | Vh |
| H | L | Vl |
| L | H | Vl |
| L | L | Vh |

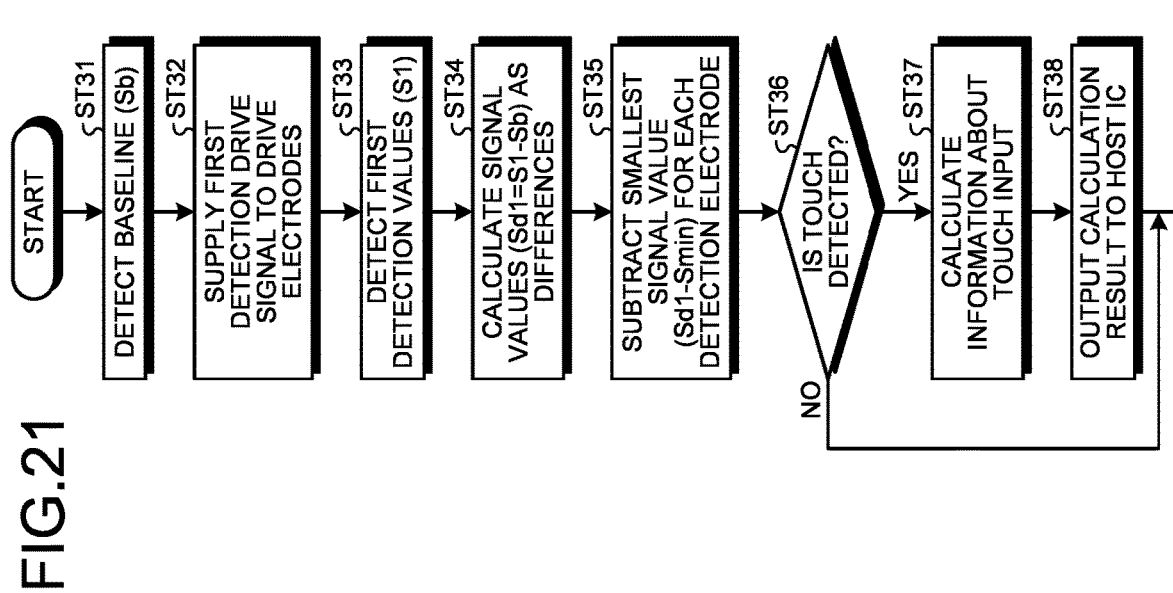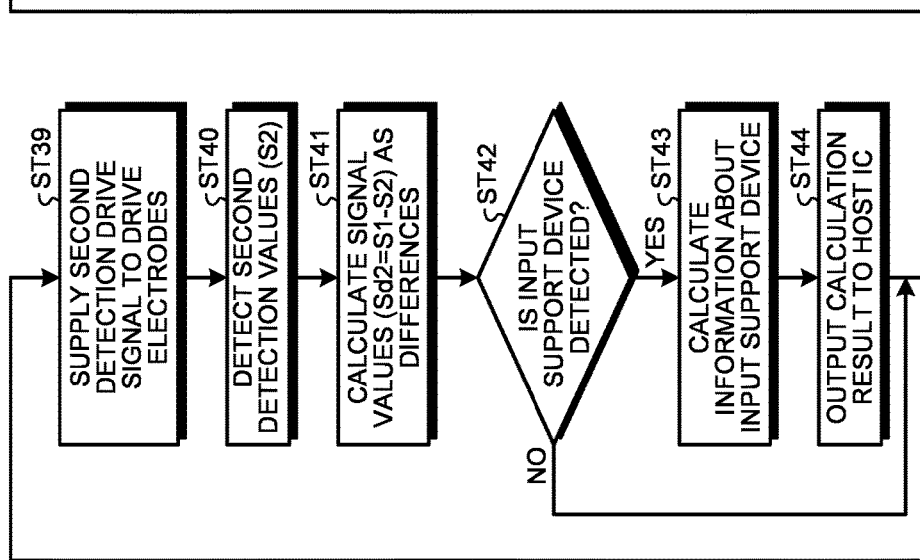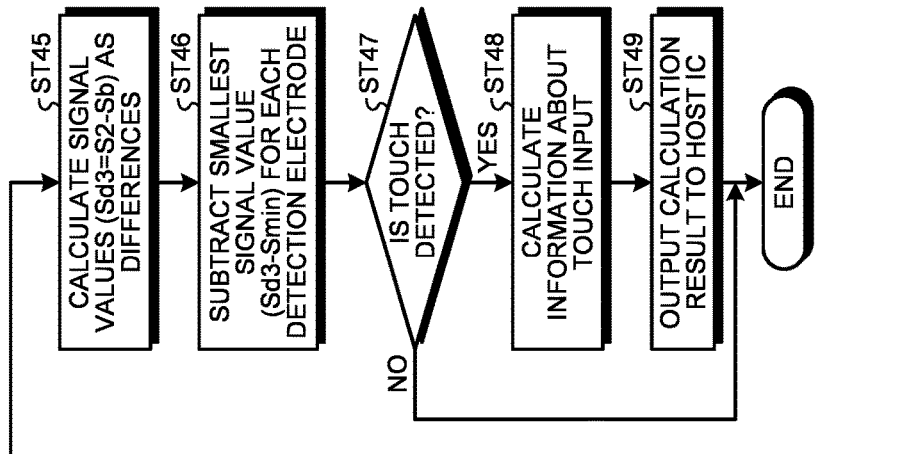
FIG.21

FIG.23

(TABLE 2)

| TouchEN | EN | VCOMSEL | Vout |
|---|---|---|---|
| L | H | H | Vh |
| L | H | L | Vl |
| L | L | H | Vl |
| L | L | L | Vh |
| H | H | H | Vh |
| H | H | L | Vl |
| H | L | H | Vl |
| H | L | L | Vl |

INPUT DETECTION SYSTEM AND DETECTION DEVICE

CROSS-REFERENCE TO RELATED APPLICATION

This application claims the benefit of priority from Japanese Patent Application No. 2021-107451 filed on Jun. 29, 2021, the entire contents of which are incorporated herein by reference.

BACKGROUND

1. Technical Field

The present disclosure relates to an input detection system and a detection device.

2. Description of the Related Art

Japanese Patent Nos. 6342105 and 6532631 describe an input support device (referred to as an operation knob or a knob in Japanese Patent Nos. 6342105 and 6532631) that is placed on a touch panel configured to detect change in electrostatic capacitance or change in a contact region and supports input operations through the touch panel. As a method for detecting the input support device, a method with which the input support device is detected using resonance of a resonance circuit provided in the input support device has been known. In an input detection system using such an input support device, drive electrodes of the touch panel are driven at a drive frequency in accordance with a resonant frequency of the input support device.

The input detection system using the input support device possibly causes false detection due to external noise. Increase in detection values is required in order to prevent the false detection due to noise.

An object of the present disclosure is to provide an input detection system and a detection device capable of improving detection sensitivity.

SUMMARY

An input detection system according to an embodiment of the present disclosure includes a detection device including a plurality of drive electrodes and a plurality of detection electrodes arrayed in a detection region, and a drive electrode scan circuit configured to supply a drive signal to the drive electrodes, and an input device including an LC circuit, a first electrode coupled to one end side of the LC circuit, and a second electrode coupled to the other end side of the LC circuit. The drive electrode scan circuit supplies the drive signal to at least equal to or more than one of the drive electrodes and supplies, to the others of the drive electrodes, an opposite phase signal as a drive signal having an opposite phase to a phase of the drive signal.

A detection device according to an embodiment in which an input device including an LC circuit and a first electrode and a second electrode coupled to the LC circuit is arranged in a detection region is disclosed. The detection device includes a plurality of drive electrodes and a plurality of detection electrodes arrayed in the detection region, and a drive electrode scan circuit configured to supply a drive signal to the drive electrodes. The drive electrode scan circuit supplies the drive signal to at least equal to or more than one of the drive electrodes and supplies, to the others of the drive electrodes, an opposite phase signal as a drive signal having an opposite phase to a phase of the drive signal.

BRIEF DESCRIPTION OF THE DRAWINGS

FIG. 21 is a flowchart for explaining a method for detecting the input support device and the finger;

FIG. 23 is a table illustrating a relation between various control signals that are supplied to the drive electrode scan circuit and an output signal of a switch circuit in the input detection system in the second embodiment;

DETAILED DESCRIPTION

Figure 1:
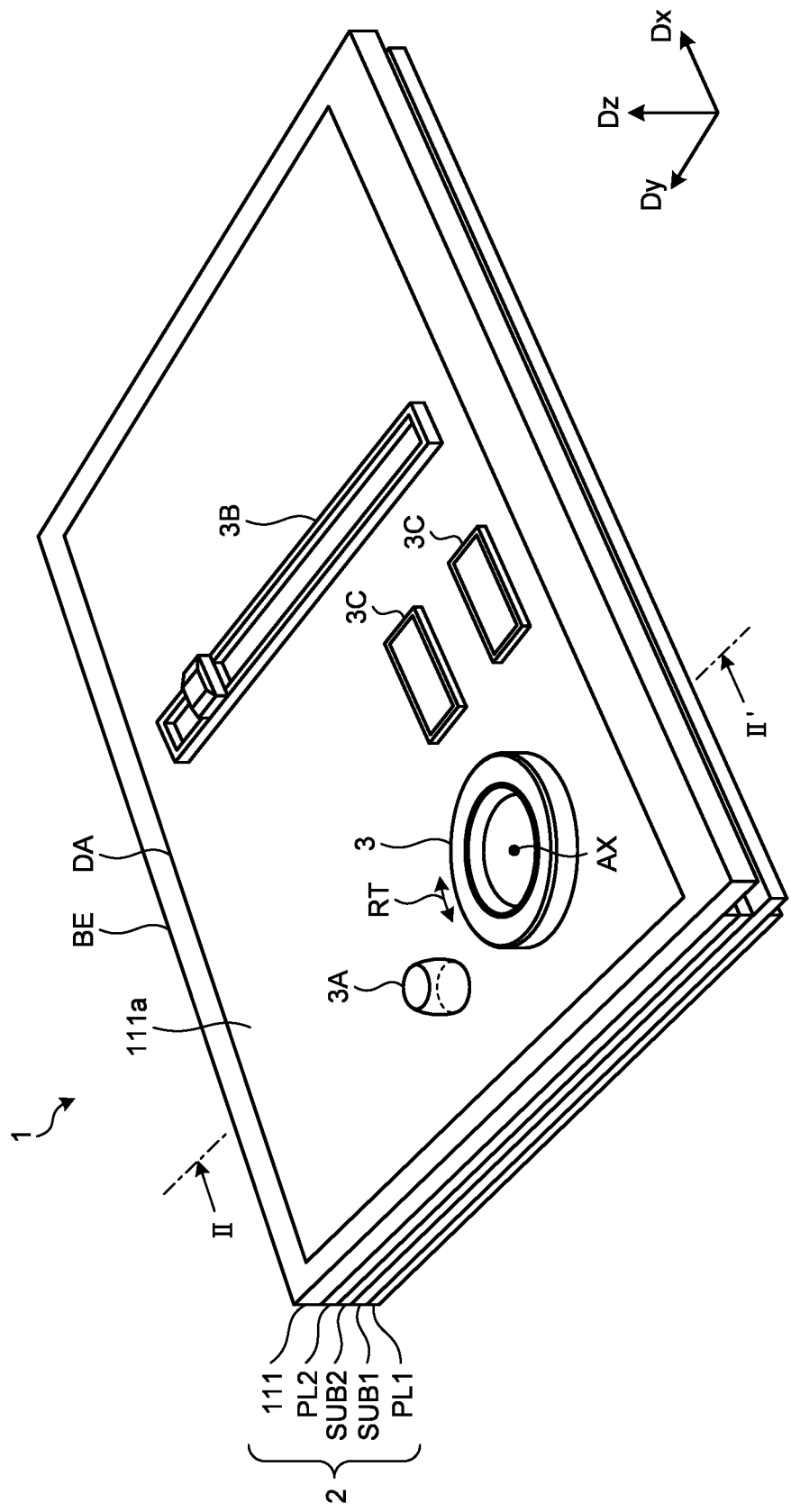
FIG. 1 is a perspective view schematically illustrating an input detection system according to a first embodiment.

Aspects for carrying out the present disclosure (embodiments) will be described in detail with reference to the drawings. Contents described in the following embodiments do not limit the present disclosure. Components described below include those that can be easily assumed by those skilled in the art and substantially the same components. Furthermore, the components described below can be appropriately combined. What is disclosed herein is merely an example, and appropriate modifications within the gist of the disclosure of which those skilled in the art can easily think are naturally encompassed in the scope of the present disclosure. In the drawings, widths, thicknesses, shapes, and the like of the components can be schematically illustrated in comparison with actual aspects for more clear explanation. They are however merely examples and do not limit interpretation of the present disclosure. In the present disclosure and the drawings, the same reference numerals denote components similar to those described before with reference to the drawing that has been already referred, and detail explanation thereof can be appropriately omitted.

In the present specification and the scope of the disclosure, when representing an aspect in which one structure is arranged above another structure, simple expression "above" includes both of the case in which the one structure is arranged directly on the other structure and the case in which the one structure is arranged above the other structure with yet another structure interposed therebetween unless otherwise specified.

First Embodiment

Figure 2:
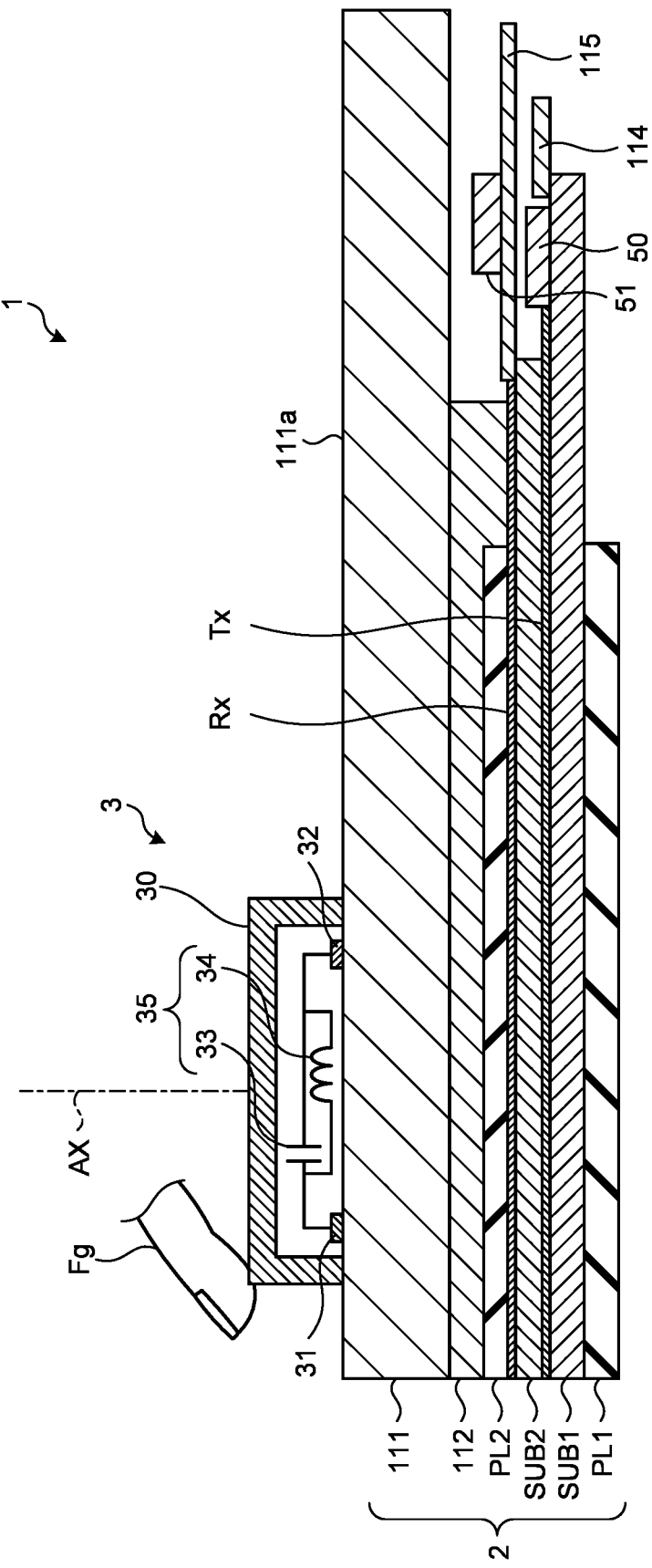
FIG. 2 is a cross-sectional view cut along line II-II' in FIG. 1.

FIG. 1 is a perspective view schematically illustrating an input detection system according to a first embodiment. FIG. 2 is a cross-sectional view cut along line II-II' in FIG. 1. As illustrated in FIG. 1 and FIG. 2, an input detection system 1 includes a display device 2 and an input support device (input device) 3.

One direction of a plane (upper surface 111a) of the display device 2 is a first direction Dx, and a direction orthogonal to the first direction Dx is a second direction Dy. The second direction Dy is not limited to be orthogonal to the first direction Dx and may intersect with the first direction Dx at an angle other than 90°. A third direction Dz orthogonal to the first direction Dx and the second direction Dy corresponds to the thickness direction of an array substrate SUB1.

The display device 2 is, for example, a liquid crystal display (LCD). The display device 2 is however not limited thereto and may be, for example, an organic electro-luminescence (EL) display panel (organic light emitting diode (OLED)) or an inorganic EL display (micro LED, mini LED). Alternatively, the display device 2 may be an electrophoretic display (EPD) that uses electrophoretic elements as display elements.

The display device 2 is a display device with a detection function that includes drive electrodes Tx and detection electrodes Rx (refer to FIG. 3) and has functions as a mutual electrostatic capacitance-type touch panel (detection device). In the present embodiment, some of the electrodes and wiring of the display device 2 are shared by electrodes (drive electrodes Tx) and wiring of the touch panel (detection device).

As illustrated in FIG. 1, the display device 2 includes the array substrate SUB1, a counter substrate SUB2, a first polarizing plate PL1, a second polarizing plate PL2, a cover member 111, and an adhesive layer 112 (refer to FIG. 2). The first polarizing plate PL1, the array substrate SUB1, the counter substrate SUB2, the second polarizing plate PL2, the adhesive layer 112, and the cover member 111 are stacked in this order in the third direction Dz.

The array substrate SUB1 is a drive circuit substrate for driving a plurality of pixels PX. The array substrate SUB1 includes a first substrate 10 as a base body. The drive electrodes Tx are provided above the array substrate SUB1. The array substrate SUB1 includes transistors and various wiring lines such as scan lines GL and pixel signal lines SL (refer to FIG. 3) provided on the first substrate 10. The counter substrate SUB2 is provided so as to face the array substrate SUB1. A liquid crystal layer as a display function layer is provided between the array substrate SUB1 and the counter substrate SUB2. The detection electrodes Rx are provided above the counter substrate SUB2.

As illustrated in FIG. 1, a peripheral region BE is provided on the outer side of a display region DA in the display device 2. The display region DA is formed to have a square shape but the outer shape of the display region DA is not limited thereto. For example, the display region DA may have a substantially square shape with curved corners or may have a cutout. Alternatively, the display region DA may have another polygonal shape or another shape such as a circular shape and an elliptic shape.

The display region DA is a region for displaying an image and is a region in which the pixels PX (refer to FIG. 3) are provided. The peripheral region BE indicates a region on the inner side of the outer circumference of the array substrate SUB1 and on the outer side of the display region DA. The peripheral region BE may have a frame shape surrounding the display region DA, and in this case, the peripheral region BE can also be referred to as a frame region.

As illustrated in FIG. 2, a display integrated circuit (IC) 50 and a wiring substrate 114 are coupled to the protruding portion of the array substrate SUB1. The display IC 50 includes a control circuit that controls display of the display device 2 and touch detection. The display IC 50 is not limited to this example and may be mounted on the wiring substrate 114. Arrangement of the display IC 50 is not limited thereto, and the display IC 50 may be provided on a control substrate or a flexible substrate outside the module, for example.

A wiring substrate 115 is coupled to the counter substrate SUB2. A detection IC 51 is mounted on the wiring substrate 115. The detection IC 51 includes a detection circuit 76 (refer to FIG. 8) and receives supply of detection signals Vdet from the detection electrodes Rx. The detection IC 51 can detect the input support device 3 and a finger based on the detection signals Vdet. Arrangement of the detection IC 51 is not limited thereto, and the detection IC 51 may be provided on a control substrate or a flexible substrate outside the module, for example.

Each of the wiring substrate 114 and the wiring substrate 115 is configured by, for example, flexible printed circuits (FPC).

In the present specification, when the display IC 50 and the detection IC 51 need not to be distinguished from each other for explanation, they can be referred to as a control circuit simply. Some of the circuits and functions included in the display IC 50 may be provided in the detection IC 51, and some of the circuits and functions included in the detection IC 51 may be provided in the display IC 50. The control circuit may include circuit elements and wiring formed separately from the display IC 50 and the detection IC 51 such as circuit elements and wiring formed on the array substrate SUB1.

As illustrated in FIG. 1 and FIG. 2, the input support device 3 is arranged (mounted) on the upper surface 111a of the cover member 111 for use. A user can perform an input operation on the display device 2 by operating the input support device 3 arranged above the display region DA of the display device 2. The input support device 3 is, for example, a rotary knob and has a circular shape in a plan view when seen from the upper surface 111a of the display device 2. The display device 2 can detect a position of the input support device 3 in a plane and a rotation operation RT centered on a center axis AX. That is to say, in the present embodiment, the display region DA is a region in which the drive electrodes Tx and the detection electrodes Rx (refer to FIG. 3) are provided and serves also as a detection region.

As illustrated in FIG. 2, the input support device 3 includes a housing 30, a first electrode 31, a second electrode 32, and an LC circuit 35. The housing 30 is formed by, for example, a conductor made of a metal material and is a hollow member having a space therein. The housing 30 is not limited to be made of the metal material and may be made of a resin material. Alternatively, the housing 30 may be formed by providing the resin material so as to cover the surface of the metal material.

The first electrode 31, the second electrode 32, and the LC circuit 35 are provided in the housing 30 so as to be rotatable around the center axis AX. The LC circuit 35 configures an LC resonance circuit in which a capacitor 33 and an inductor 34 are coupled in parallel with each other. The first electrode 31 is coupled to one end side of the LC circuit 35 (coupling portion N1 (refer to FIG. 5) of the capacitor 33 and the inductor 34 on one end side). The second electrode 32 is coupled to the other end side of the LC circuit 35 (coupling portion N2 (refer to FIG. 5) of the capacitor 33 and the inductor 34 on the other end side). The display device 2 can detect positions of the first electrode 31 and the second electrode 32 using LC resonance of the LC circuit 35.

FIG. 1 illustrates a plurality of input support devices 3A, 3B, and 3C as other examples of the input support device 3. The input support device 3A is a rotary knob and is formed into a tab shape having a planar shape (radius) smaller than that of the input support device 3. The input support device 3B is a slider, and an input operation can be performed by displacement of a tab thereof in a plane. The input support device 3B has a bar-like shape in a plan view. The input support device 3C is a button or an input key, and an input operation can be performed by touching the input support device 3C or performing a press-in operation thereon. The input detection system 1 is not limited to have the configuration in which all of the input support devices 3, 3A, 3B, and 3C are mounted, and it is sufficient that at least equal to or more than one of the input support devices 3, 3A, 3B, and 3C is provided. Hereinafter, the input support device 3 is described. Explanation of the input support device 3 can be applied also to the other input support devices 3A, 3B, and 3C.

Figure 3:
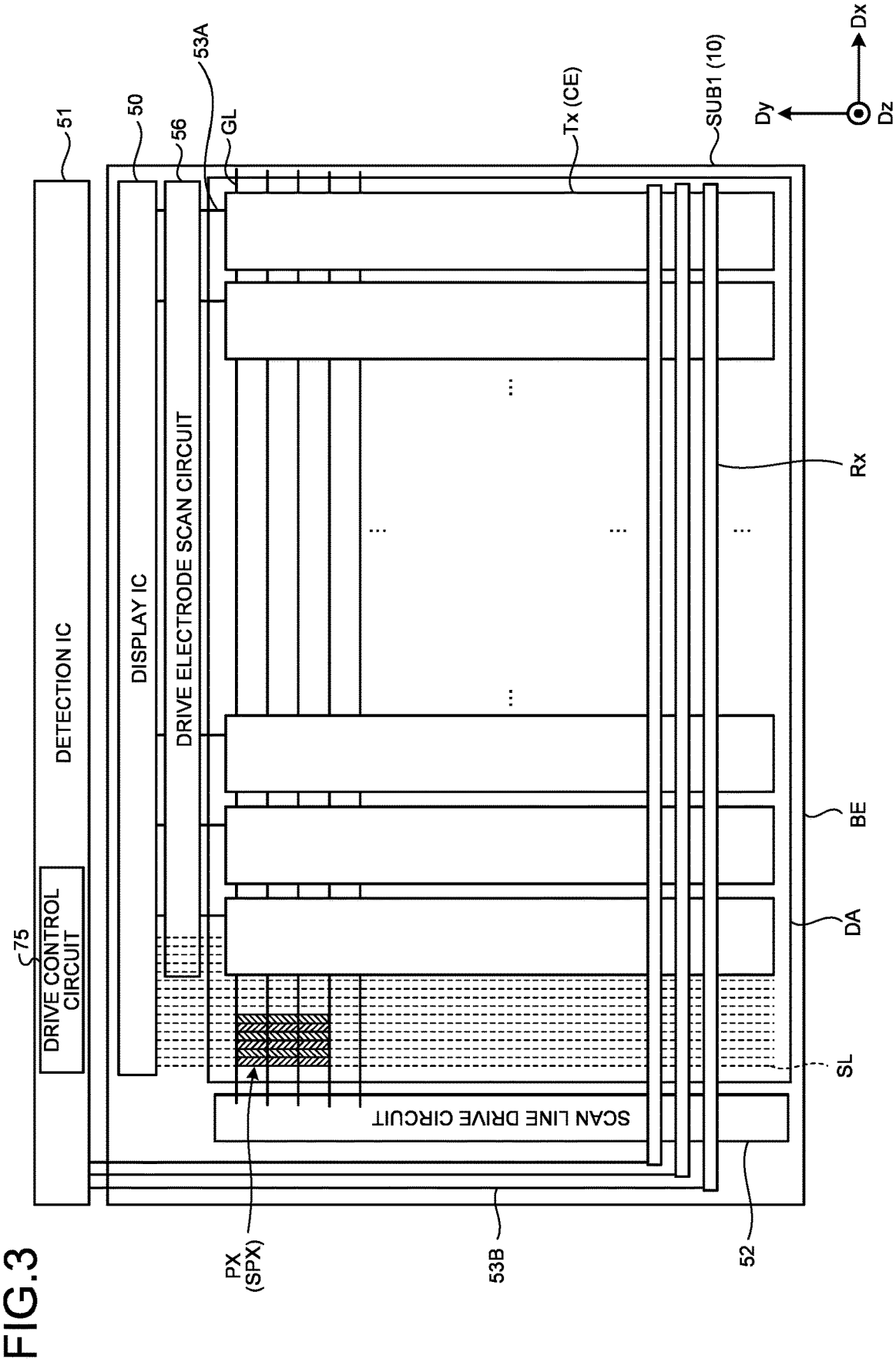
FIG. 3 is a plan view schematically illustrating an array substrate included in a display device.

FIG. 3 is a plan view schematically illustrating the array substrate included in the display device. FIG. 3 schematically illustrates a part of the detection electrodes Rx provided on the counter substrate SUB2 in order to explain the relation between the drive electrodes Tx and the detection electrodes Rx. As illustrated in FIG. 3, the pixels PX (sub pixels SPX) are arrayed in a matrix with a row-column configuration in the display region DA. The pixel signal lines SL and the scan lines GL are provided so as to correspond to the sub pixels SPX. The pixel signal lines SL are coupled to the control circuit such as the display IC 50 provided in the peripheral region BE. A scan line drive circuit 52 is provided in a region extending along the second direction Dy in the peripheral region BE. The scan lines GL are coupled to the scan line drive circuit 52. The scan line drive circuit 52 is a circuit configured to supply a scan signal for driving the pixels PX (sub pixels SPX) to the scan lines GL.

Each of the drive electrodes Tx extends in the second direction Dy and is aligned in the first direction Dx. The drive electrodes Tx are coupled to a drive electrode scan circuit 56 and the display IC 50 through coupling wiring lines 53A. Each of the detection electrodes Rx extends in the first direction Dx and is aligned in the second direction Dy. The detection electrodes Rx are coupled to the detection IC 51 through coupling wiring lines 53B. The drive electrodes Tx and the detection electrodes Rx are provided so as to intersect with each other in a plan view. An electrostatic capacitance is formed in each of intersecting portions of the drive electrodes Tx and the detection electrodes Rx. The detection IC 51 can detect the detection target based on the detection signals Vdet that are output in accordance with change in the mutual electrostatic capacitances between the drive electrodes Tx and the detection electrodes Rx.

Although FIG. 3 illustrates only some drive electrodes Tx, some detection electrodes Rx, and some pixels PX (sub pixels SPX) for easier viewing, the drive electrodes Tx, the detection electrodes Rx, and the pixels PX are arranged on the entire display region DA. That is to say, the pixels PX are arranged so as to overlap with one drive electrode Tx. One drive electrode Tx is arranged so as to overlap with the pixel signal lines SL.

The drive electrodes Tx serve as common electrodes for forming an electric field between the drive electrodes Tx and pixel electrodes (not illustrated) in display and as the drive electrodes Tx for detecting the input support device 3 and the finger (for forming electrostatic capacitances between the drive electrodes Tx and the detection electrodes Rx) in touch detection. To be specific, the display IC 50 supplies a display drive signal VCOM to the drive electrodes Tx in display. A drive control circuit 75 included in the detection IC 51 supplies a drive control signal EXVCOM for generating a detection drive signal VD to the display IC 50 in touch detection. The display IC 50 and the drive electrode scan circuit 56 supply the detection drive signal VD to the drive electrodes Tx in order based on the drive control signal EXVCOM. Details of driving of the drive electrodes Tx by the drive electrode scan circuit 56 will be described later.

Figure 4:
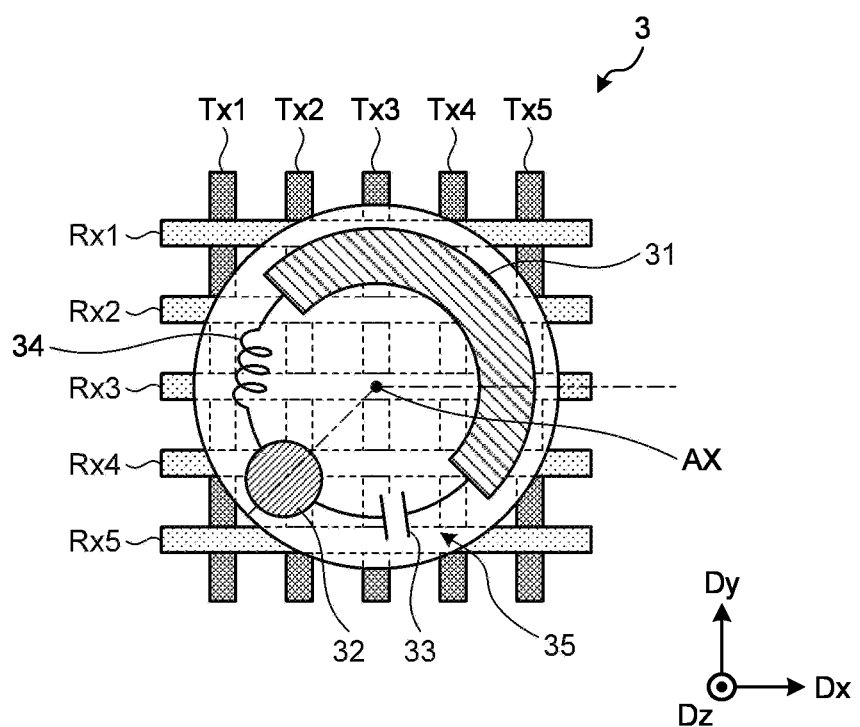
FIG. 4 is a plan view schematically illustrating an input support device, a plurality of drive electrodes, and a plurality of detection electrodes.

Next, a method for detecting the input support device 3 will be described with reference to FIG. 4 to FIG. 6. FIG. 4 is a plan view schematically illustrating the input support device, the drive electrodes, and the detection electrodes. The input support device 3 has a circular shape in a plan view as illustrated in FIG. 4. The first electrode 31 and the second electrode 32 are arranged on the opposite sides with respect to the center axis AX in a plan view and rotate around the center axis AX. The first electrode 31 and the second electrode 32 have different shapes and areas in a plan view. In FIG. 4, the drive electrodes Tx aligned in the first direction Dx are represented as drive electrodes Tx1, Tx2, Tx3, Tx4, and Tx5. The detection electrodes Rx aligned in the second direction Dy are represented as detection electrodes Rx1, Rx2, Rx3, Rx4, and Rx5.

To be specific, the second electrode 32 has a circular shape in a plan view. The first electrode 31 has a curved shape curved in a circular arc form (C-shaped form) along the inner circumference of the housing 30 (refer to FIG. 5). The second electrode 32 is arranged on a circumference formed by virtually extending the circular arc configuring the first electrode 31 and is arranged between one end side and the other end side of the first electrode 31 along the circular arc form. The first electrode 31 has a larger area than that of the second electrode 32.

The number of drive electrodes Tx overlapping with the second electrode 32 is therefore different from the number of drive electrodes Tx overlapping with the first electrode 31. Alternatively, the total area of the drive electrodes Tx overlapping with the second electrode 32 is different from the total area of the drive electrodes Tx overlapping with the first electrode 31. In the example illustrated in FIG. 4, the second electrode 32 is arranged so as to overlap with one drive electrode Tx (Tx2), and the first electrode 31 is arranged so as to overlap with four drive electrodes Tx (Tx2, Tx3, Tx4, and Tx5). The shapes of the first electrode 31 and the second electrode 32 are not limited to those in the example illustrated in FIG. 4 and may be other shapes such as square shapes and polygonal shapes. The number of drive electrodes Tx overlapping with the second electrode 32 may be two, three, or equal to or more than five.

The capacitor 33 configuring the LC circuit 35 is coupled between the first electrode 31 and one end side of the second electrode 32. The inductor 34 is coupled between the first electrode 31 and the other end side of the second electrode 32. FIG. 4 equivalently illustrates the capacitor 33 and the inductor 34 configuring the LC circuit 35, and, for example, the LC circuit 35 may be formed by a chip component mounted on a substrate. It is sufficient that the capacitor 33 and the inductor 34 are coupled electrically in parallel between the first electrode 31 and the second electrode 32, and arrangement thereof in the housing 30 may be desirably set.

Figure 5:
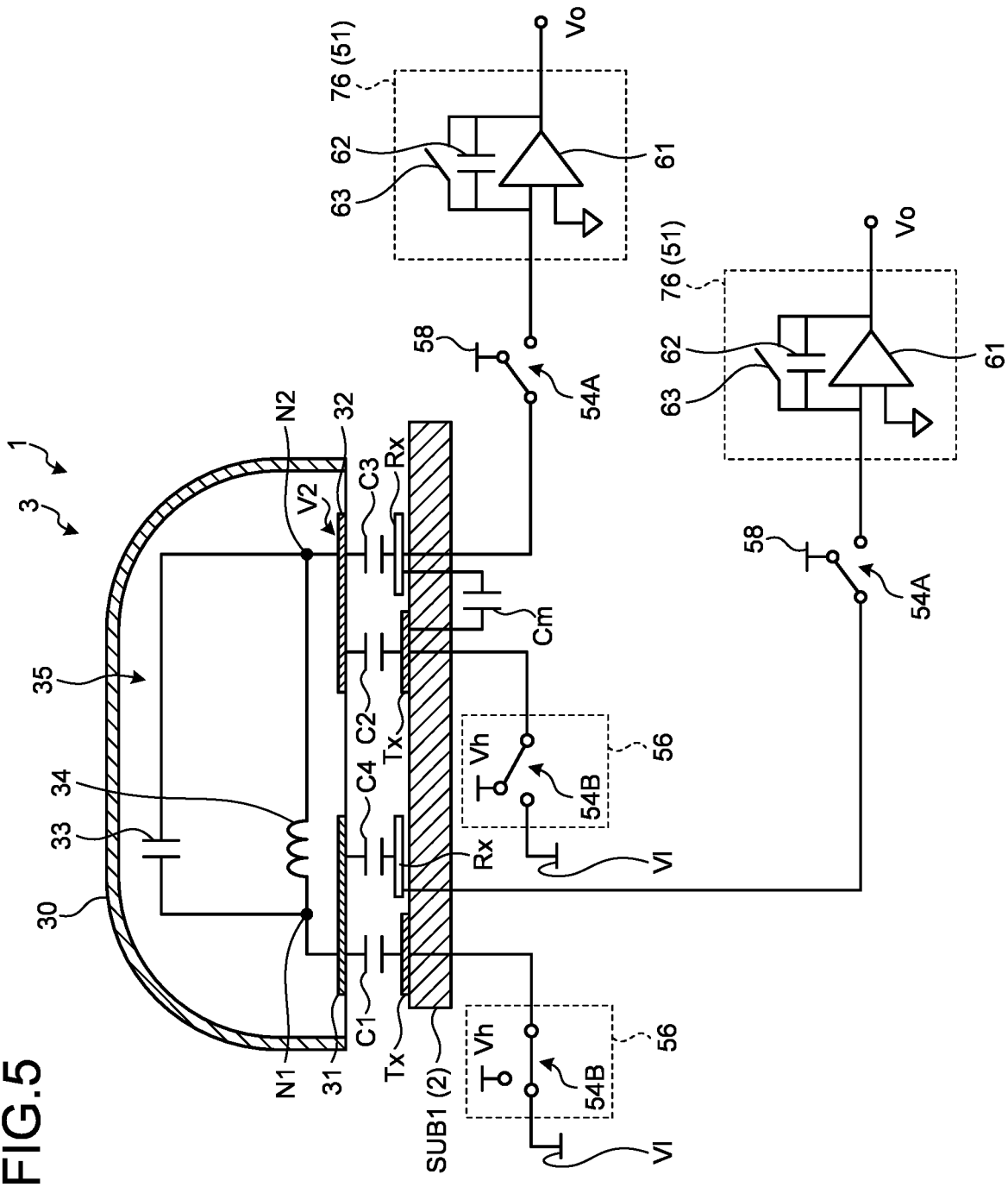
FIG. 5 is a descriptive view for explaining a method for detecting the input support device.

FIG. 5 is a descriptive view for explaining the method for detecting the input support device. As illustrated in FIG. 5, each of the first electrode 31 and the second electrode 32 of the input support device 3 faces the drive electrode Tx on the array substrate SUB1 and the detection electrode Rx on the counter substrate SUB2 at certain timing in a detection period (refer to FIG. 11).

The input support device 3 is arranged so as to overlap with the drive electrodes Tx and the detection electrodes Rx. A capacitance C1 is formed between the first electrode 31 and one drive electrode Tx (the drive electrode Tx on the left side in FIG. 5). A capacitance C2 is formed between the second electrode 32 and the other drive electrode Tx (the drive electrode Tx on the right side in FIG. 5). The one drive electrode Tx and the other drive electrode Tx receive supply of a first voltage signal Vh or a second voltage signal Vl through switch circuits 54B of the drive electrode scan circuit 56. Details of signals that are supplied to the one drive electrode Tx and the other drive electrode Tx will be described later with reference to FIG. 6.

A capacitance C3 is formed between the second electrode 32 and the detection electrode Rx facing the second electrode 32. Each of the detection electrodes Rx (the detection electrode Rx on the right side in FIG. 5 and the detection electrode Rx on the left side in FIG. 5) is coupled to the detection circuit 76 or another node 58 through each switch element 54A. The node 58 is coupled to, for example, a reference potential (for example, a ground potential GND).

The node 58 may be coupled to wiring that is coupled to a non-inverting input portion of a detection signal amplifier 61, which will be described later, instead of the reference potential. Thus, when the detection electrode Rx is coupled to the node 58, an output-side potential of the detection electrode Rx becomes the same as a potential of the non-inverting input portion of the detection signal amplifier 61. A configuration in which the node 58 is coupled to a floating electrode or a high-impedance (Hi-z) circuit or the switch element 54A is not coupled to the node 58 to bring the detection electrode Rx into a floating state in periods other than a period where it is coupled to the detection circuit 76 can be also employed.

The switch elements 54A that are respectively coupled to the detection electrodes Rx are controlled to be switched into ON or OFF states synchronously. A mutual electrostatic capacitance Cm is formed between the drive electrode Tx and the detection electrode Rx. A capacitance C4 is formed between the first electrode 31 and the detection electrode Rx facing the first electrode 31.

The detection circuit 76 is a signal processing circuit provided in the detection IC 51 and is a circuit that receives the detection signals Vdet (refer to FIG. 6) output from the detection electrodes Rx and performs predetermined signal processing thereon to output an output signal Vo. The detection circuit 76 includes the detection signal amplifier 61, a capacitive element 62, and a reset switch 63. The detection circuit 76 is not limited thereto and may further include an A/D conversion circuit (not illustrated) that converts an analog signal output from the detection signal amplifier 61 into a digital signal.

Figure 6:
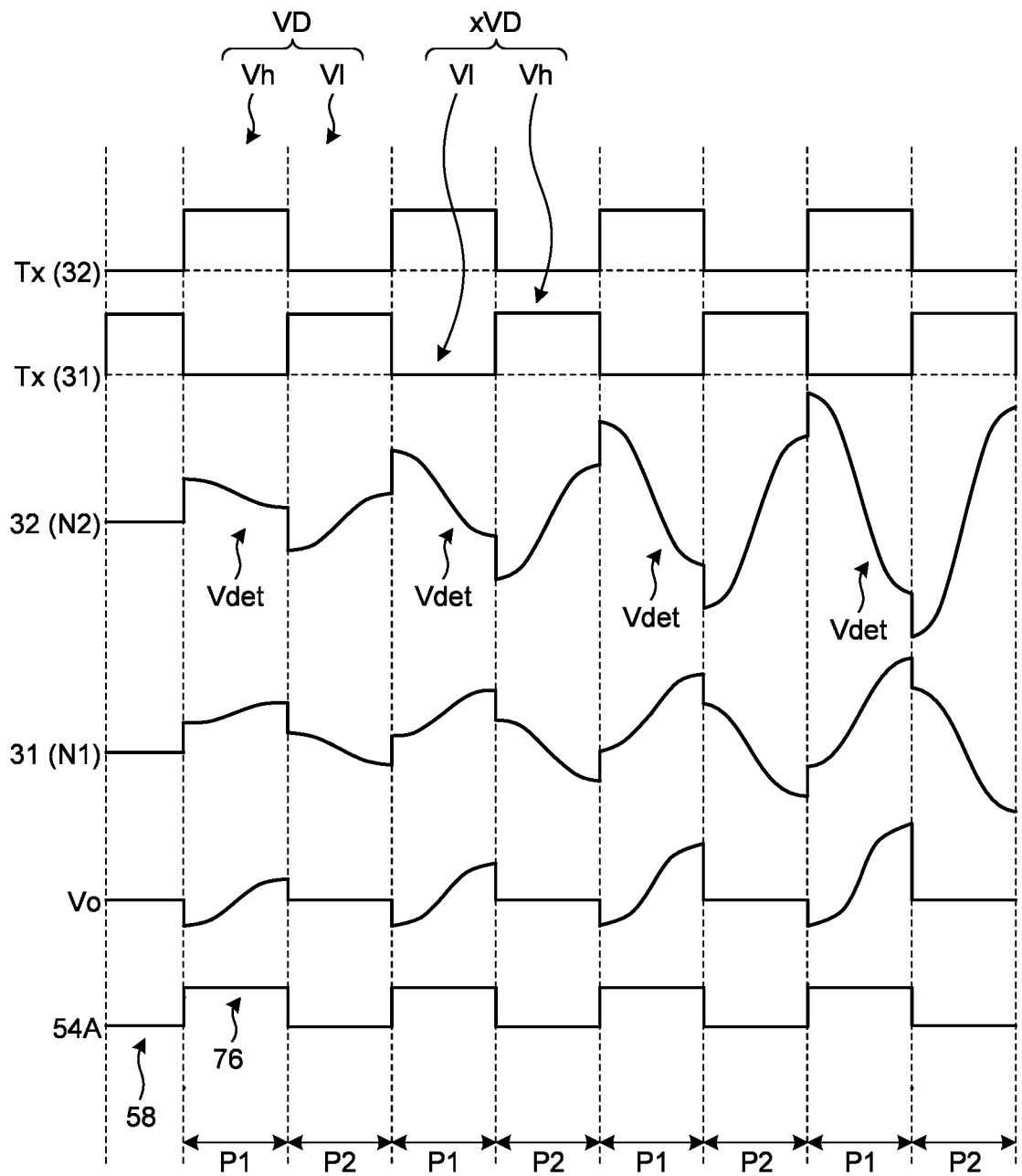
FIG. 6 is a timing waveform chart for explaining the method for detecting the input support device.

FIG. 6 is a timing waveform chart for explaining the method for detecting the input support device. As illustrated in FIG. 5 and FIG. 6, the detection drive signal VD of alternate rectangular waves is supplied to the other drive electrode Tx (the drive electrode Tx on the right side in FIG. 5) by an operation of the switch circuit 54B. To be more specific, the first voltage signal Vh at a high level potential and the second voltage signal Vl at a low level potential are alternately applied repeatedly at a predetermined frequency by a switching operation of the switch circuit 54B, so that the detection drive signal VD is formed and is supplied to the other drive electrode Tx. A potential of the other drive electrode Tx varies in accordance with the detection drive signal VD.

Periods that are repeated in synchronization with the detection drive signal VD are a first period P1 and a second period P2. The first period P1 is a period in which the other drive electrode Tx is coupled to the first voltage signal Vh (a period in which the switch circuit 54B couples the other drive electrode Tx and first voltage signal supply wiring L-Vh (refer to FIG. 9)). The second period P2 is a period in which the other drive electrode Tx is coupled to the second voltage signal Vl (a period in which the switch circuit 54B couples the other drive electrode Tx and second voltage signal supply wiring L-Vl (refer to FIG. 9)). Although the detection drive signal VD is formed by a combination of one-time input of the first voltage signal Vh and one-time input of the second voltage signal Vl in FIG. 6, it is needless to say that the configuration in which they are repeated a plurality of number of times can also be regarded as the detection drive signal VD.

As illustrated in FIG. 5 and FIG. 6, an opposite phase detection drive signal xVD (hereinafter, referred to as an opposite phase signal) the phase of which shifts from that of the detection drive signal VD by 180° ($\pi$) is supplied to the one drive electrode Tx (the drive electrode Tx on the left side in FIG. 5) by an operation of the switch circuit 54B. To be more specific, the opposite phase signal xVD is formed by alternately applying the first voltage signal Vh and the second voltage signal Vl repeatedly at the same frequency as that of the detection drive signal VD and has a waveform that is inverted from that of the detection drive signal VD. In the first period P1, the detection drive signal VD has the first voltage signal Vh and the opposite phase signal xVD has the second voltage signal Vl. In the second period P2, the detection drive signal VD has the second voltage signal Vl and the opposite phase signal xVD has the first voltage signal Vh.

Although not illustrated in FIG. 5 and FIG. 6, the opposite phase signal xVD is supplied to the drive electrodes Tx different from the other drive electrode Tx (the drive electrode Tx on the right side in FIG. 5). In other words, the drive electrode scan circuit 56 supplies the detection drive signal VD to at least equal to or more than one drive electrode Tx (for example, the drive electrode Tx on the right side in FIG. 5) and supplies, to the other drive electrodes Tx, the opposite phase signal xVD having the opposite phase to that of the detection drive signal VD.

The detection electrode Rx outputs the detection signals Vdet based on the mutual electrostatic capacitance Cm. To be specific, the one drive electrode Tx (the drive electrode Tx on the left side in FIG. 5) is coupled to the opposite phase signal xVD, as described above. Signals with different potentials are thereby supplied to the first electrode 31 and the second electrode 32 in each first period P1 and each second period P2. The detection electrode Rx is coupled to the detection circuit 76 with the switching operation of the switch element 54A in the first period P1. With this configuration, variation in a potential based on the mutual electrostatic capacitance Cm is output, as the detection signals Vdet, to the detection circuit 76 from the detection electrode Rx. Coupling between the detection electrode Rx and the detection circuit 76 is interrupted with the switching operation of the switch element 54A in the second period P2. The detection electrode Rx is coupled to the node 58 with the switching operation of the switch element 54A in the second period P2.

The detection signal amplifier 61 of the detection circuit 76 amplifies the detection signals Vdet supplied from the detection electrode Rx. A reference voltage is input to the non-inverting input portion of the detection signal amplifier 61, and the detection electrode Rx is coupled to an inverting input portion. Alternatively, a signal (opposite phase signal xVD) that is the same as that to the one drive electrode Tx is input as the reference voltage in the present embodiment. The detection circuit 76 can reset charges of the capacitive element 62 by turning the reset switch 63 ON.

The detection drive signal VD has the same frequency as the resonant frequency of the LC circuit 35. In the present embodiment, for example, the switching operation of the switch circuit 54B is performed based on the resonant frequency to form the detection drive signal VD having the resonant frequency. The second electrode 32 overlapping with the other drive electrode Tx is also driven at the resonant frequency, so that resonance of the LC circuit 35 is generated. With this configuration, the amplitudes of the detection signals Vdet are thereby increased as the first period P1 and the second period P2 are repeated in the detection period. As illustrated in FIG. 6, the amplitudes of the detection signals Vdet are increased and the potential of the output signal Vo from the detection circuit 76 varies to be increased as the first period P1 is repeated a plurality of number of times.

The opposite phase signal xVD that is supplied to the one drive electrode Tx has the same frequency as the resonant frequency of the LC circuit 35. Similarly to the detection drive signal VD, for example, the switching operation of the switch circuit 54B is performed based on the resonant frequency to form the opposite phase signal xVD having the resonant frequency. The first electrode 31 overlapping with the one drive electrode Tx is therefore also driven at the resonant frequency. This configuration increases the potential difference between the first electrode 31 and the second electrode 32 to enable the amplitudes of the detection signals Vdet to be increased in comparison with the case in which a fixed potential (for example, the second voltage signal Vl) is continuously supplied to the one drive electrode Tx over the first period P1 and the second period P2.

With the resonance of the LC circuit 35, the waveform that is generated in the first electrode 31 varies from the waveform that is generated in the second electrode 32 such that the polarities of the first electrode 31 and the second electrode 32 are changed so as to invert from each other. To be specific, the potential of the first electrode 31 varies to be increased and the second electrode 32 varies to be decreased in each first period P1. The potential of the first electrode 31 varies to be decreased and the potential of the second electrode 32 varies to be increased in each second period P2.

Accordingly, the detection signals Vdet that are output from the detection electrode Rx overlapping with the first electrode 31 and the output signal Vo (not illustrated), and the detection signals Vdet that are output from the detection electrode Rx overlapping with the second electrode 32 and the output signal Vo have different polarities. The input detection system 1 may detect various pieces of information of the input support device 3 based on the signal values of the detection signals Vdet having different polarities.

On the other hand, when the finger different from the input support device 3 comes into contact with or close to the upper surface 111a (refer to FIG. 1), the detection signals Vdet vary in accordance with change in the mutual electrostatic capacitance Cm. That is to say, since no resonance is generated with detection of the finger or the like, change in the amplitudes of the detection signals Vdet over time as illustrated in FIG. 6 does not occur. The input detection system 1 can thus determine whether the detection target is the finger or the input support device 3 using the LC resonance of the LC circuit 35. In the present embodiment, the opposite phase signal xVD is supplied to the other drive electrodes Tx than the drive electrode Tx to which the detection drive signal VD is supplied. The detection signals Vdet having a different polarity are output also when the finger comes into contact with or close to the drive electrode Tx to which the opposite phase signal xVD is supplied. Details of the method for detecting the finger will be described later.

Figure 7:
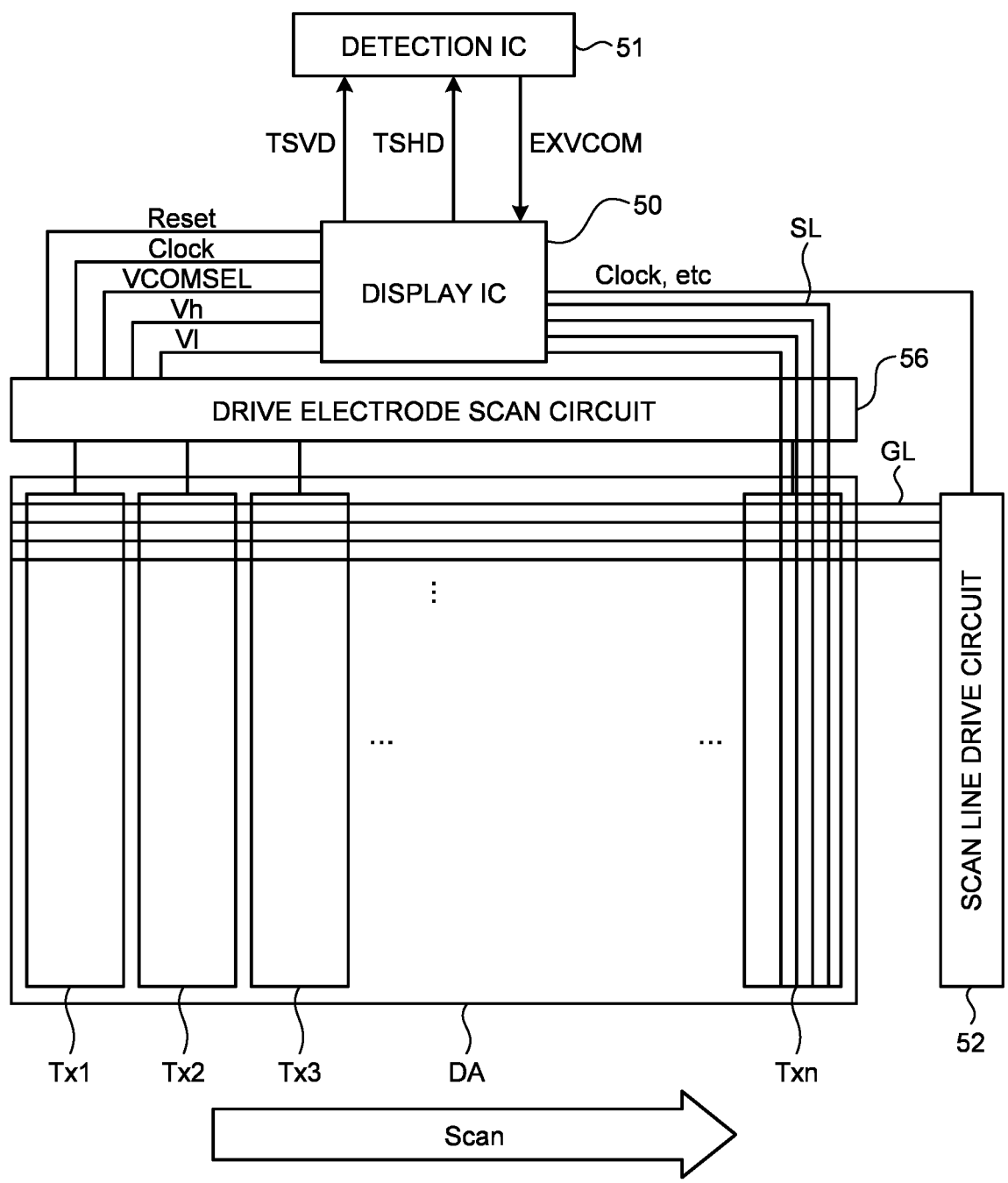
FIG. 7 is a block diagram schematically illustrating an example of the configuration of the input detection system.

Next, a method for driving the drive electrodes Tx by the detection IC 51 and the drive electrode scan circuit 56 will be explained. FIG. 7 is a block diagram schematically illustrating an example of the configuration of the input detection system. As illustrated in FIG. 7, the display IC 50 outputs control signals TSVD and TSHD to the detection IC 51. The detection IC 51 executes detection for one frame by scanning the drive electrodes Tx based on the control signals TSVD and TSHD. The detection IC 51 outputs the drive control signal EXVCOM to the display IC 50.

The display IC 50 outputs various control signals such as a reset signal Reset, a clock signal Clock, and a control signal VCOMSEL to the drive electrode scan circuit 56. The display IC 50 generates the control signal VCOMSEL, the first voltage signal Vh, and the second voltage signal Vl based on the drive control signal EXVCOM and outputs the first voltage signal Vh and the second voltage signal Vl to the drive electrode scan circuit 56.

The drive electrode scan circuit 56 selects the drive electrode Tx to be driven in order among the drive electrodes Tx based on the control signals from the display IC 50 and supplies the detection drive signal VD to the drive electrode Tx to be driven. The drive electrode scan circuit 56 supplies the opposite phase signal xVD to the other drive electrodes Tx different from the drive electrode Tx to be driven. To be specific, when the drive electrode scan circuit 56 supplies the detection drive signal VD to the drive electrode Tx1 among the drive electrodes Tx, it supplies the opposite phase signal xVD to the other drive electrodes Tx2 to Txn. In the subsequent detection period, when the drive electrode scan circuit 56 supplies the detection drive signal VD to the drive electrode Tx2 among the drive electrodes Tx, it supplies the opposite phase signal xVD to the other drive electrodes Tx1 and Tx3 to Txn. Thereafter, the drive electrode scan circuit 56 outputs the drive electrodes Tx3, . . . , and Txn to be driven for scanning in order similarly.

The display IC 50 outputs various control signals such as the clock signal Clock to the scan line drive circuit 52 in display. The scan line drive circuit 52 supplies a scan signal VGL (refer to FIG. 11) for driving the pixels PX (sub pixels SPX) to the scan lines GL based on the control signals from the display IC 50.

Figure 8:
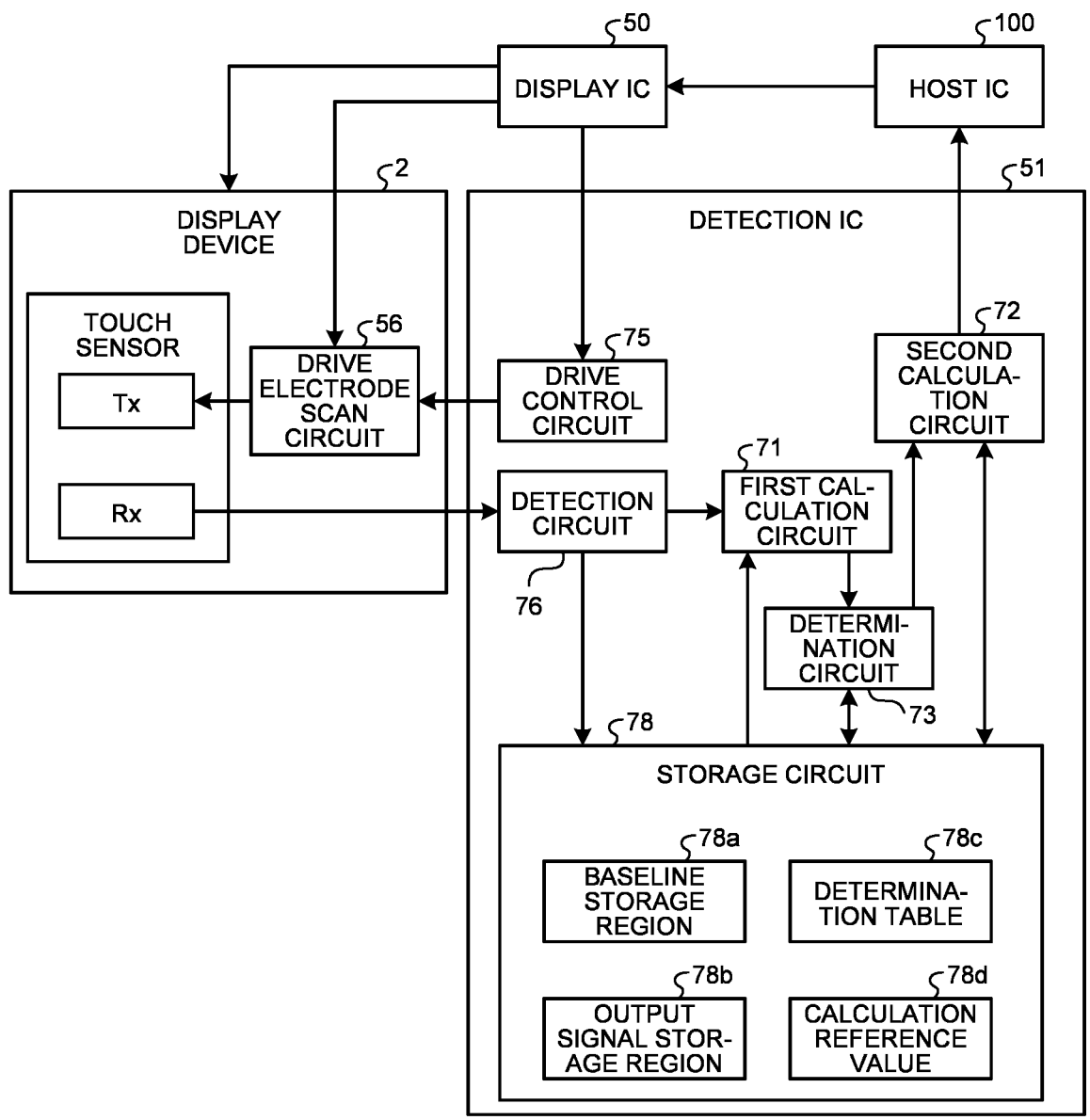
FIG. 8 is a block diagram schematically illustrating examples of the configurations of the display device and a detection IC.

FIG. 8 is a block diagram schematically illustrating examples of the configurations of the display device and the detection IC. FIG. 8 illustrates the components related to detection of the input support device 3 and the finger by the display device 2 (touch sensor) and omits components of the display IC 50 related to the display operation.

The detection IC 51 includes a first calculation circuit 71, a second calculation circuit 72, a determination circuit 73, the drive control circuit 75, the detection circuit 76, and a storage circuit 78. The detection circuit 76 performs the signal processing on the detection signals Vdet output from the detection electrodes Rx as described above. The first calculation circuit 71 performs calculation processing based on the output signal Vo from the detection circuit 76. The first calculation circuit 71 is a circuit configured to perform, for example, calculation processing of difference between the output signal Vo and a baseline and calculation processing in touch detection of the finger, which will be described later.

The determination circuit 73 is a circuit configured to receive results of the calculation processing from the first calculation circuit 71 and make determination about presence or absence of the detection target and the type of the input support device 3 or the finger.

The second calculation circuit 72 is a circuit configured to calculate information (for example, position coordinates of the finger, or position coordinates and the rotation operation RT of the input support device 3) about an input operation by the finger or the input support device 3 when the input support device 3 or the finger is detected. The second calculation circuit 72 transmits, to a host IC 100, the information about the input operation by the finger or the input support device 3 that has been provided as a calculation result. The host IC 100 outputs a control signal to the display IC 50 to perform display in accordance with the input operation.

The storage circuit 78 is a circuit configured to store therein various data that is used for calculation of the detection signals Vdet of the finger or the input support device 3. The storage circuit 78 includes, for example, a baseline storage region 78a, an output signal storage region 78b, a determination table 78c, and a calculation reference value 78d.

The baseline storage region 78a stores therein information of a baseline Sb of the display device 2. The baseline Sb is information of the output signal Vo for one frame when the drive electrodes Tx are scanned in a state where, for example, the input support device 3 and the finger are absent on the display region DA. The detection IC 51 may acquire the baseline Sb at each predetermined timing such as when or after the display device 2 is powered on.

Figure 15:
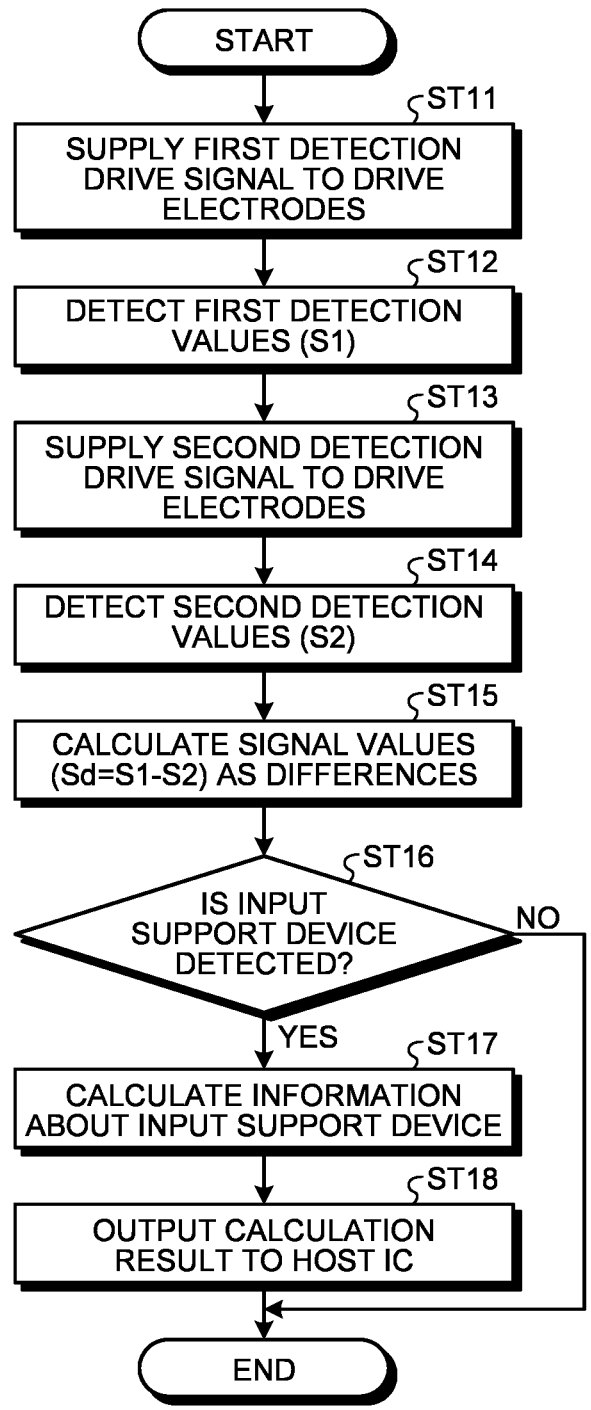
FIG. 15 is a flowchart for explaining the method for detecting the input support device.

The output signal storage region 78b stores therein the output signal Vo output from the detection circuit 76 as first detection values S1 and second detection values S2 (refer to FIG. 15). The output signal storage region 78b stores therein, for example, information formed by the output signal Vo for one frame as frame data. The output signal storage region 78b temporarily stores therein data of the first detection values S1 and the second detection values S2 (refer to FIG. 15) for one frame, and the like that are used for calculation of differences.

The determination table 78c stores therein information that is used for determination of the type of the input support device 3 and the finger. The determination table 78c stores therein a threshold (reference value) for determining the input support device 3 and a threshold (reference value) for determining the finger different from the input support device 3. Alternatively, the determination table 78c may store therein a detection pattern (for example, information of two-dimensional distribution of the first detection values S1 and the second detection values S2) for determining the input support device 3. The determination circuit 73 compares the results of the calculation processing from the first calculation circuit 71 with the thresholds from the determination table 78c to determine the type of the input support device 3 and the finger.

The calculation reference value 78d stores therein various thresholds (reference values) for calculating the information (for example, the position coordinates of the finger, or the position coordinates and the rotation operation RT of the input support device 3) about the input operation by the finger or the input support device 3. The second calculation circuit 72 compares the pieces of information from the first calculation circuit 71 and the determination circuit 73 and the thresholds stored in the calculation reference value 78d to calculate various pieces of information such as the position of the input support device 3 and the finger. The calculation reference value 78d stores therein a minimum signal value Smin (refer to FIG. 16) for each detection electrode Rx.

The drive control circuit 75 is a circuit configured to output the drive control signal EXVCOM based on the control signals TSVD and TSHD from the display IC 50. The drive electrode scan circuit 56 supplies the detection drive signal VD and the opposite phase signal xVD to the drive electrodes Tx based on the drive control signal EXVCOM.

Figure 9:
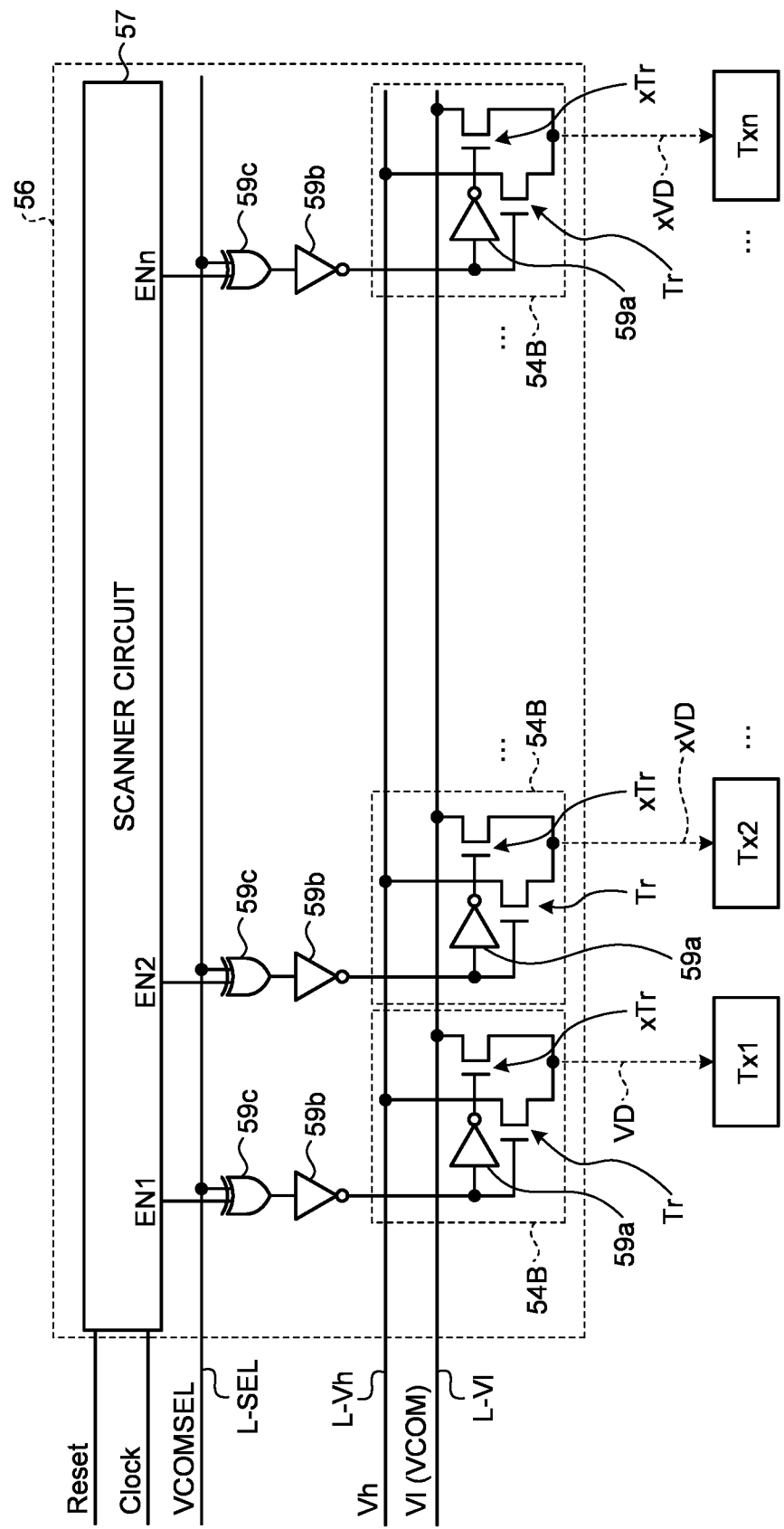
FIG. 9 is a circuit diagram illustrating an example of the configuration of a drive electrode scan circuit.

FIG. 9 is a circuit diagram illustrating an example of the configuration of the drive electrode scan circuit. As illustrated in FIG. 9, the drive electrode scan circuit 56 includes a scanner circuit 57, the switch circuits 54B, NOT circuits 59b (negative circuits), and XOR circuits 59c (exclusive-OR circuits). The switch circuit 54B, the NOT circuit 59b, and the XOR circuit 59c are provided for each of the drive electrodes Tx.

The scanner circuit 57 is a circuit configured to output control signals EN in order based on the reset signal Reset and the clock signal Clock. The drive electrodes Tx to be driven are selected in order based on the control signals EN.

Each XOR circuit 59c is a circuit configured to output exclusive OR of the control signal EN supplied from the scanner circuit 57 and the control signal VCOMSEL supplied through control signal supply wiring L-SEL. The control signal VCOMSEL has AC rectangular waves in which an H level and an L level are alternately repeated, and the detection drive signal VD is formed in synchronization with the control signal VCOMSEL.

Each NOT circuit 59b is circuit configured to invert and output the signal input from the XOR circuit 59c. In other words, the NOT circuit 59b outputs an L level signal when an H level signal is input and outputs an H level signal when an L level signal is input.

Each switch circuit 54B includes a first transistor Tr, a second transistor xTr, and a NOT circuit 59a. The gate of the first transistor Tr is coupled to the NOT circuit 59b. The gate of the second transistor xTr is coupled to the NOT circuit 59b and the NOT circuit 59a. In other words, the first transistor Tr and the second transistor xTr are controlled to operate such that ON and OFF states thereof are inverted when the same signal is input thereto.

When the first transistor Tr is in an ON state (coupling state) and the second transistor xTr is in an OFF state (non-coupling state), the drive electrode Tx is coupled to the first voltage signal supply wiring L-Vh, and the first voltage signal Vh is supplied through the first voltage signal supply wiring L-Vh. When the first transistor Tr is in an OFF state (non-coupling state) and the second transistor xTr is in an ON state (coupling state), the drive electrode Tx is coupled to the second voltage signal supply wiring L-Vl, and the second voltage signal Vl is supplied through the second voltage signal supply wiring L-Vl.

Figures 10, 11:
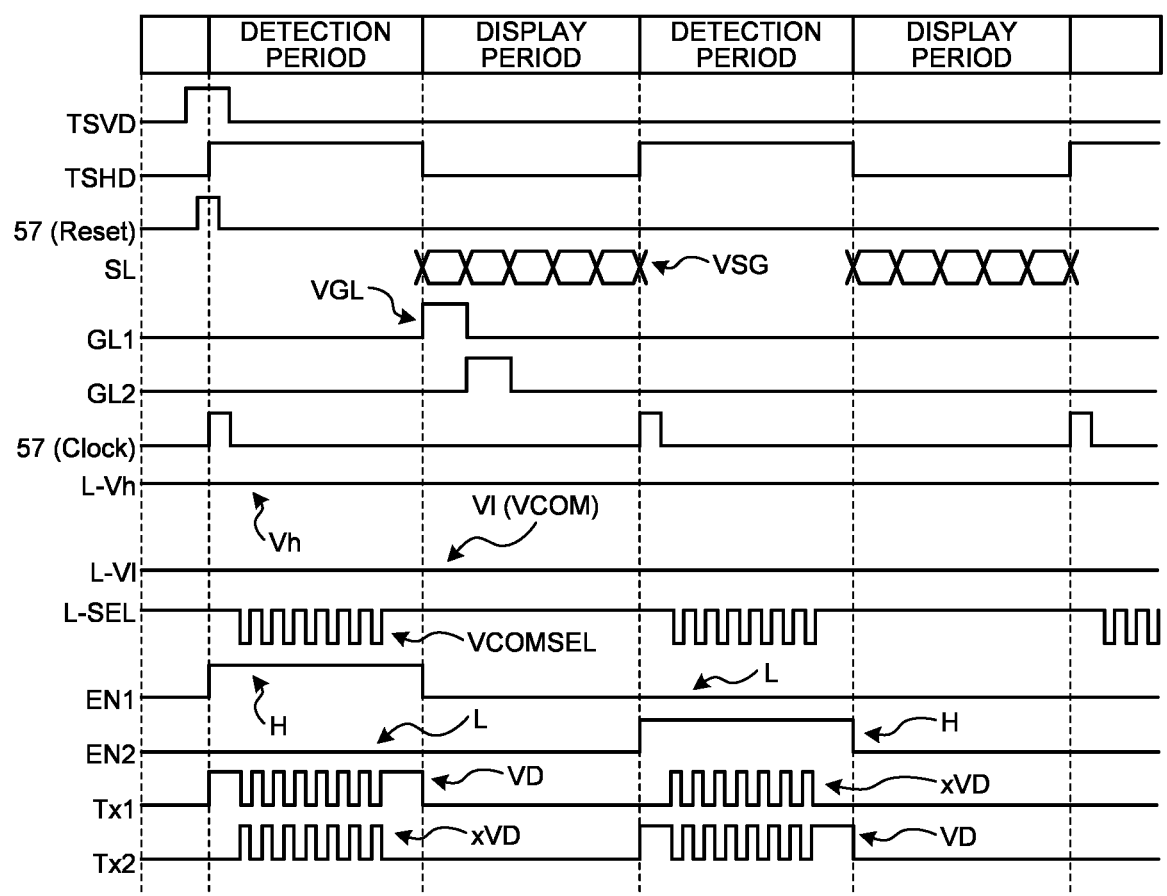
FIG. 10 is a table illustrating a relation between various control signals that are supplied to the drive electrode scan circuit and an output signal of a switch circuit.
FIG. 11 is a timing waveform chart for explaining display periods and detection periods in the input detection system.

FIG. 10 is a table illustrating a relation between various control signals that are supplied to the drive electrode scan circuit and an output signal of the switch circuit. As illustrated in Table 1 in FIG. 10, when the control signal EN is at an H level and the control signal VCOMSEL is at an H level, the output Vout from the switch circuit 54B is the first voltage signal Vh. When the control signal EN is at the H level and the control signal VCOMSEL is at an L level, the output Vout from the switch circuit 54B is the second voltage signal Vl. That is to say, when the control signal EN is at the H level, the detection drive signal VD having the same phase as that of the control signal VCOMSEL is supplied to the drive electrode Tx.

When the control signal EN is at an L level and the control signal VCOMSEL is at the H level, the output Vout from the switch circuit 54B is the second voltage signal Vl. When the control signal EN is at the L level and the control signal VCOMSEL is at the L level, the output Vout from the switch circuit 54B is the first voltage signal Vh. That is to say, when the control signal EN is at the L level, the opposite phase signal xVD having an opposite phase to that of the control signal VCOMSEL is supplied to the drive electrode Tx.

FIG. 11 is a timing waveform chart for explaining display periods and detection periods in the input detection system. As illustrated in FIG. 11, the display IC 50 and the detection IC 51 of the input detection system 1 execute the display periods and the detection periods alternately in a time division manner. When the control signal TSVD is brought into the H level, display and detection for one frame are started. The periods where the control signal TSHD is at an H level is the detection periods, and the periods where the control signal TSHD is at an L level are the display periods.

FIG. 11 is merely a schematically illustrated timing waveform chart, and the length of each period and the number of pixel signal lines SL, scan lines GL, and drive electrodes Tx, for example, are not limited thereto. The display periods and the detection periods may be arranged in any way. For example, display and detection may be repeated every frame.

The scanner circuit 57 outputs H-level control signals EN1, EN2, . . . , and ENn for scanning in order in the respective detection periods. The drive electrodes Tx to be driven are selected in a time division manner in accordance with the H-level control signals EN1, EN2, . . . , and ENn. The display IC 50 supplies the control signal VCOMSEL of alternate rectangular waves to the control signal supply wiring L-SEL in each detection period. The detection drive signal VD having the same phase as that of the control signal VCOMSEL is thereby supplied to the drive electrode Tx to be driven. The opposite phase signal xVD having the opposite phase to that of the detection drive signal VD is supplied to the other drive electrodes Tx (drive electrodes Tx not to be driven) different from the drive electrode Tx to be driven.

The scan line drive circuit 52 supplies the scan signal VGL to the scan lines GL1, GL2, and the like in order in the display periods. The display IC 50 supplies pixel signals VSG to the pixel signal lines SL based on the image signal from the host IC 100. The pixel signals VSG are thereby supplied in order to the pixels PX selected based on the scan signal VGL, so that an image is displayed.

The scanner circuit 57 outputs L-level control signals EN1, EN2, . . . , and ENn in the display periods. The display IC 50 supplies an H-level control signal VCOMSEL to the control signal supply wiring L-SEL in the display periods. As illustrated in Table 1 in FIG. 10, the second voltage signal Vl is supplied to all the drive electrodes Tx. The display IC 50 sets the second voltage signal Vl to a voltage signal equal to the display drive signal VCOM. The drive electrodes Tx thereby function as the common electrodes in the display periods.

As described above, the drive electrode scan circuit 56 supplies the detection drive signal VD and the opposite phase signal xVD to the drive electrodes Tx in the detection periods and supplies the second voltage signal Vl (display drive signal VCOM) as the fixed potential to the drive electrodes Tx in the display periods based on various control signals.

Figure 12:
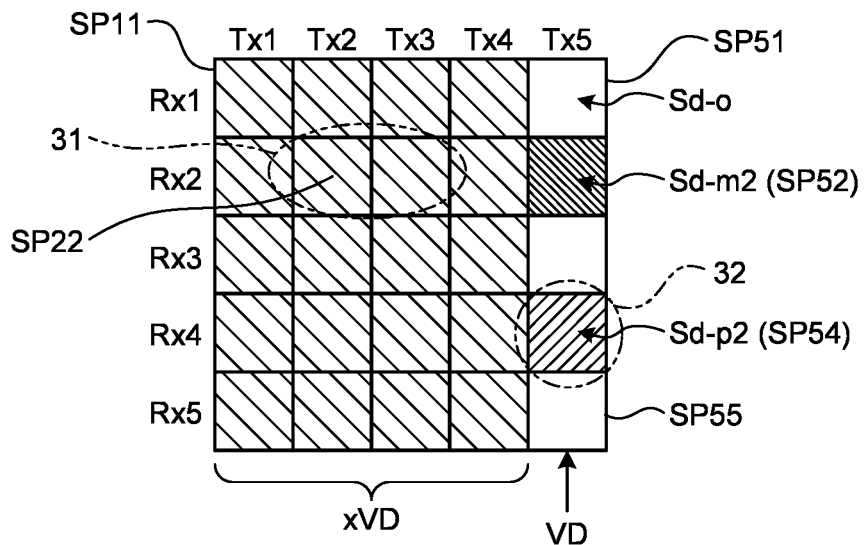
FIG. 12 is a descriptive view for explaining distribution of signal values when a detection drive signal is supplied to the drive electrode superimposed with a second electrode.
Figure 13:
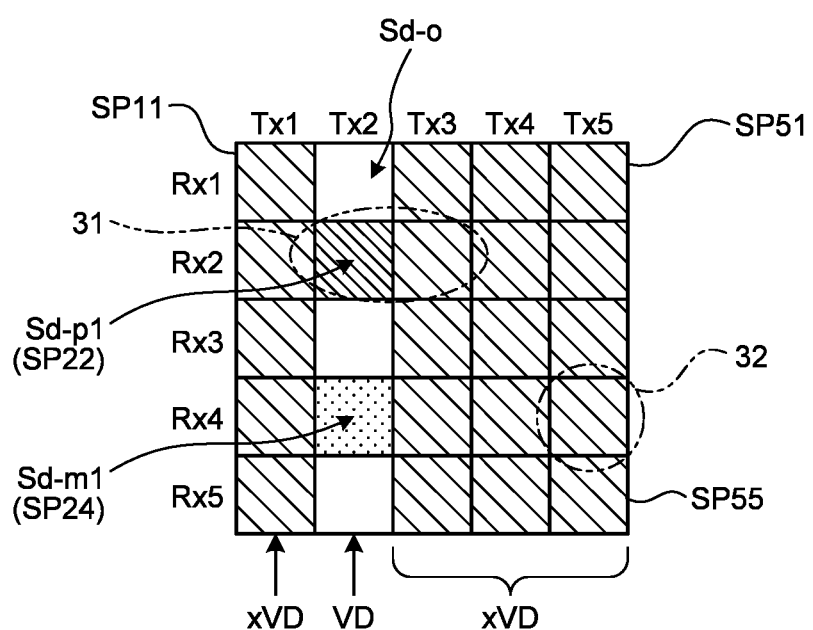
FIG. 13 is a descriptive view for explaining distribution of signal values when the detection drive signal is supplied to the drive electrode superimposed with a first electrode.
Figure 14:
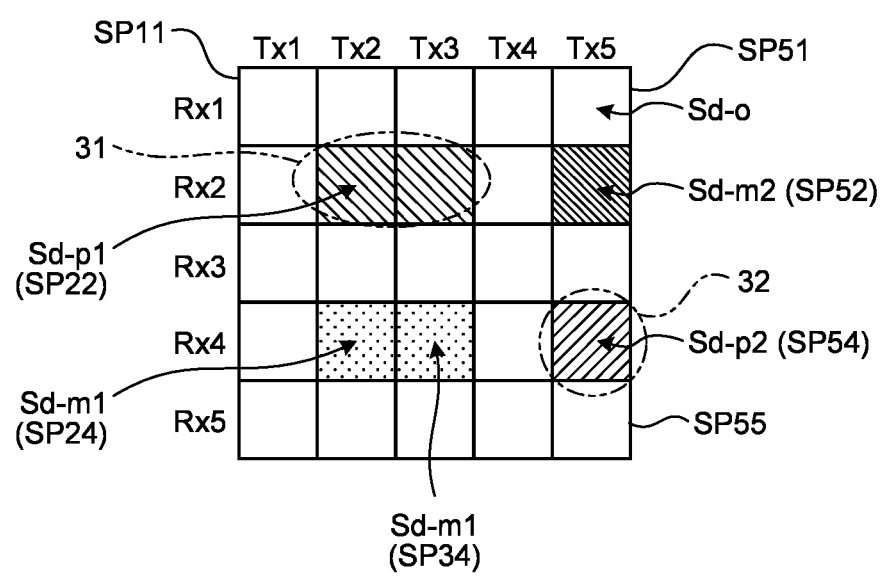
FIG. 14 is a descriptive view for explaining distribution of signal values based on output from detection electrodes Rx1 to Rx5 when drive electrodes Tx1 to Tx5 are scanned in order.

Next, a method for detecting the input support device 3 in the input detection system 1 will be described with reference to FIG. 12 to FIG. 14. FIG. 12 is a descriptive view for explaining distribution of signal values when the detection drive signal is supplied to the drive electrode superimposed with the second electrode. FIG. 12 to FIG. 14 schematically illustrate two-dimensional distribution of signal values Sd of the detection signals Vdet (output signal Vo) at respective positions SP where the drive electrodes Tx and the detection electrodes Rx intersect with each other.

For example, a position SP11 indicates a position where the drive electrode Tx1 and the detection electrode Rx1 intersect with each other, and a position SP51 indicates a position where the drive electrode Tx5 and the detection electrode Rx1 intersect with each other. FIG. 15 omits illustration of some reference numerals of the positions SP for making the drawing easy to view. FIG. 12 to FIG. 14 schematically illustrate the two-dimensional distribution of the signal values Sd when the first electrode 31 is superimposed with positions SP22 and SP32 and the second electrode 32 is superimposed with a position SP54. The input support device 3 has the configuration illustrated in FIG. 4. Although it is conceivable that in particular, the first electrode 31 may overlap with regions other than the positions SP22 and SP32, the basic concept of signal processing on the output signal on the first electrode 31 side is the same as this case in which the first electrode 31 is provided across the two positions. The following therefore explains, in particular, the state in which the first electrode 31 is provided across only the above-mentioned two positions.

The signal values Sd are the signal values Sd as differences, which will be described later, and are provided by differences between the first detection values S1 detected by a first detection drive signal VD1 having the resonant frequency and the second detection values S2 detected by a second detection drive signal VD2 having the non-resonant frequency (frequency different from the resonant frequency). The two-dimensional distribution illustrated in FIG. 12 to FIG. 14 is not limited to the signal values Sd as the differences and may also use the first detection values S1 or the second detection values S2.

As illustrated in FIG. 12, the detection drive signal VD is supplied to the drive electrode Tx5 superimposed with the second electrode 32. The opposite phase signal xVD is supplied to the other drive electrodes Tx1 to Tx4 including the drive electrodes Tx2 and Tx3 that are superimposed with the first electrode 31. A positive polarity signal value Sd-p2 is detected at the position SP54 where the detection electrode Rx4 superimposed with the second electrode 32 and the drive electrode Tx5 intersect with each other. A negative polarity signal value Sd-m2 is detected at a position SP52 where the detection electrode Rx2 superimposed with the first electrode 31 and the drive electrode Tx5 intersect with each other. This is because the detection electrode Rx2 detects capacitance change by the first electrode 31 based on the opposite phase signal xVD since the first electrode 31 is superimposed with the intersecting positions SP22 and SP32 between the detection electrode Rx2 and the drive electrodes Tx2 and Tx3 to which the opposite phase signal xVD is supplied. A signal value Sd-o with an intermediate potential is detected at positions SP51, SP53, and SP55 where the detection electrodes Rx1, Rx3, and Rx5 superimposed with neither of the first electrode 31 nor the second electrode 32 and the drive electrode Tx5 intersect with each other.

FIG. 13 is a descriptive view for explaining distribution of signal values when the detection drive signal is supplied to the drive electrode superimposed with the first electrode. As illustrated in FIG. 13, the detection drive signal VD is supplied to the drive electrode Tx2 superimposed with the first electrode 31. The opposite phase signal xVD is supplied to the other drive electrodes Tx1, Tx3, Tx4, and Tx5 including the drive electrode Tx5 superimposed with the second electrode 32. A positive polarity signal value Sd-p1 is thereby detected at the position SP22 where the detection electrode Rx2 superimposed with the first electrode 31 and the drive electrode Tx2 intersect with each other. A negative polarity signal value Sd-m1 is detected at a position SP24 where the detection electrode Rx4 superimposed with the second electrode 32 and the drive electrode Tx2 intersect with each other. This is because the detection electrode Rx4 detects capacitance change by the second electrode 32 based on the opposite phase signal xVD since the second electrode 32 is superimposed with the intersecting position SP54 between the detection electrode Rx4 and the drive electrode Tx5 to which the opposite phase signal xVD is supplied. The signal value Sd-o with the intermediate potential is detected at positions SP21, SP23, and SP25 where the detection electrodes Rx1, Rx3, and Rx5 superimposed with neither of the first electrode 31 nor the second electrode 32 and the drive electrode Tx2 intersect with each other.

While the positions of the first electrode 31 and the second electrode 32 are not changed between FIG. 12 and FIG. 13, the drive electrodes to which the detection drive signal VD and the opposite phase signal xVD are applied are different therebetween. As a result, an arrangement relation between the drive electrode Tx to which the detection drive signal VD is supplied and the drive electrodes Tx to which the opposite phase signal xVD is supplied and the first electrode 31 and the second electrode 32 is different between these two states. The polarities of the detection signals Vdet2 that are output from the detection electrodes Rx and the magnitudes of the signal values Sd are different in accordance with these arrangement relations.

FIG. 14 is a descriptive view for explaining distribution of signal values based on output from the detection electrodes Rx1 to Rx5 when the drive electrodes Tx1 to Tx5 are scanned in order. As illustrated in FIG. 14, the two-dimensional distribution of the signal values Sd is provided when the drive electrode scan circuit 56 outputs the detection drive signal VD to the drive electrode Tx1 to the drive electrode Tx5 for scanning in order. To be more specific, the positive polarity signal value Sd-p1 is detected at the positions SP22 and SP32 superimposed with the first electrode 31. The positive polarity signal value Sd-p2 is detected at the position SP54 superimposed with the second electrode 32. Although explanation is omitted above, output values from the detection electrodes Rx when the detection drive signal VD is input to the drive electrode Tx3 are the same as those when the detection drive signal VD is input to the drive electrode Tx2 as explained with reference to FIG. 13.

The negative polarity signal value Sd-m1 is detected at positions SP24 and SP34 where the detection electrode Rx4 superimposed with the second electrode 32 and the drive electrodes Tx2 and Tx3 superimposed with the first electrode 31 intersect with each other. The negative polarity signal value Sd-m2 is detected at the position SP52 where the detection electrode Rx2 superimposed with the first electrode 31 and the drive electrode Tx5 superimposed with the second electrode 32 intersect with each other. The signal values Sd satisfy a relation of signal value Sd-m2<signal value Sd-m1<signal value Sd-o<signal value Sd-p1<signal value Sd-p2.

The detection IC 51 (the first calculation circuit 71, the second calculation circuit 72, and the determination circuit 73 (refer to FIG. 8)) can calculate the presence or absence of the input support device 3 and the information about the input operation, such as the position coordinates and the rotational operation RT of the input support device 3, based on comparison between the signal values Sd and the thresholds and the two-dimensional distribution (detection pattern) of the signal values Sd.

The drive electrode scan circuit 56 supplies the detection drive signal VD to the drive electrode Tx to be driven and supplies the opposite phase signal xVD to the other drive electrodes Tx (drive electrodes Tx not to be driven) different from the drive electrode Tx to be driven. Accordingly, the amplitudes of the detection signals Vdet are increased by the resonance of the LC circuit 35 and the signal values Sd (for example, absolute values of the signal values Sd-p2 and Sd-m2) are increased in comparison with the case in which the fixed potential is supplied to the other drive electrodes Tx. As a result, the input detection system 1 can thereby improve the detection sensitivity of the input support device 3.

FIG. 15 is a flowchart for explaining the method for detecting the input support device. As illustrated in FIG. 15, the drive electrode scan circuit 56 (refer to FIG. 9) supplies the first detection drive signal VD1 to the drive electrodes Tx in order in the detection periods (step ST11). The first detection drive signal VD1 has the resonant frequency of the LC circuit 35 of the input support device 3.

The detection electrodes Rx output, to the detection IC 51, change in the mutual electrostatic capacitances between the detection electrodes Rx and the drive electrodes Tx and signals generated by the resonance of the LC circuit 35 as the detection signals Vdet. The detection IC 51 performs signal processing on the detection signals Vdet output from the detection electrodes Rx. The detection IC 51 then detects the first detection values S1 based on the detection signals Vdet for one frame (step ST12).

The drive electrode scan circuit 56 (refer to FIG. 9) supplies the second detection drive signal VD2 to the drive electrodes Tx in order (step ST13). The second detection drive signal VD2 has the non-resonant frequency different from the resonant frequency of the LC circuit 35 of the input support device 3. Since no resonance of the LC circuit 35 is generated at ST13, change in the amplitudes of the detection signals Vdet over time as illustrated in FIG. 6 does not occur.

The detection electrodes Rx output, to the detection IC 51, change in the mutual electrostatic capacitances between the drive electrodes Tx and the detection electrodes Rx as the detection signals Vdet. The detection IC 51 performs the signal processing on the detection signals Vdet output from the detection electrodes Rx. The detection IC 51 then detects the second detection values S2 based on the detection signals Vdet for one frame (step ST14).

The first calculation circuit 71 (refer to FIG. 8) calculates the signal values Sd (S1−S2) as the differences between the first detection values S1 and the second detection values S2 (step ST15). To be more specific, the first calculation circuit 71 detects the input support device 3 based on the signal values Sd as the differences between the first detection values S1 for one frame that are detected when the first detection drive signal VD1 having the resonant frequency of the LC circuit 35 is supplied to at least equal to or more than one drive electrode Tx and the second detection values S2 for one frame that are detected when the second detection drive signal VD2 having the non-resonant frequency different from the resonant frequency is supplied thereto. The first calculation circuit 71 calculates the two-dimensional distribution of the signal values Sd as illustrated in FIG. 15.

The determination circuit 73 (refer to FIG. 8) compares the signal values Sd and the threshold to determine whether the input support device 3 is detected (step ST16). When the input support device 3 is detected (Yes at step ST16), the second calculation circuit 72 calculates the information about the input operation, such as the position coordinates and the rotation operation RT of the input support device 3, based on the two-dimensional distribution (detection pattern) of the signal values Sd (step ST17).

The second calculation circuit 72 outputs, to the host IC 100, a calculation result provided at step ST17, that is, the information about the input operation by the input support device 3 (step ST18). The host IC 100 outputs a control signal to the display IC 50 to perform display in accordance with the input operation.

When the input support device 3 is not detected (No at step ST16), the second calculation circuit 72 can omit the calculation at step ST17 and repeatedly executes the subsequent detection periods and display periods.

The above-mentioned method for detecting the input support device 3 is merely an example and can be appropriately changed. For example, detection by the first detection drive signal VD1 (steps ST11 and ST12) and detection by the second detection drive signal VD2 (steps ST13 and ST14) may be performed in the reverse order in the flow illustrated in FIG. 15.

Figure 16:
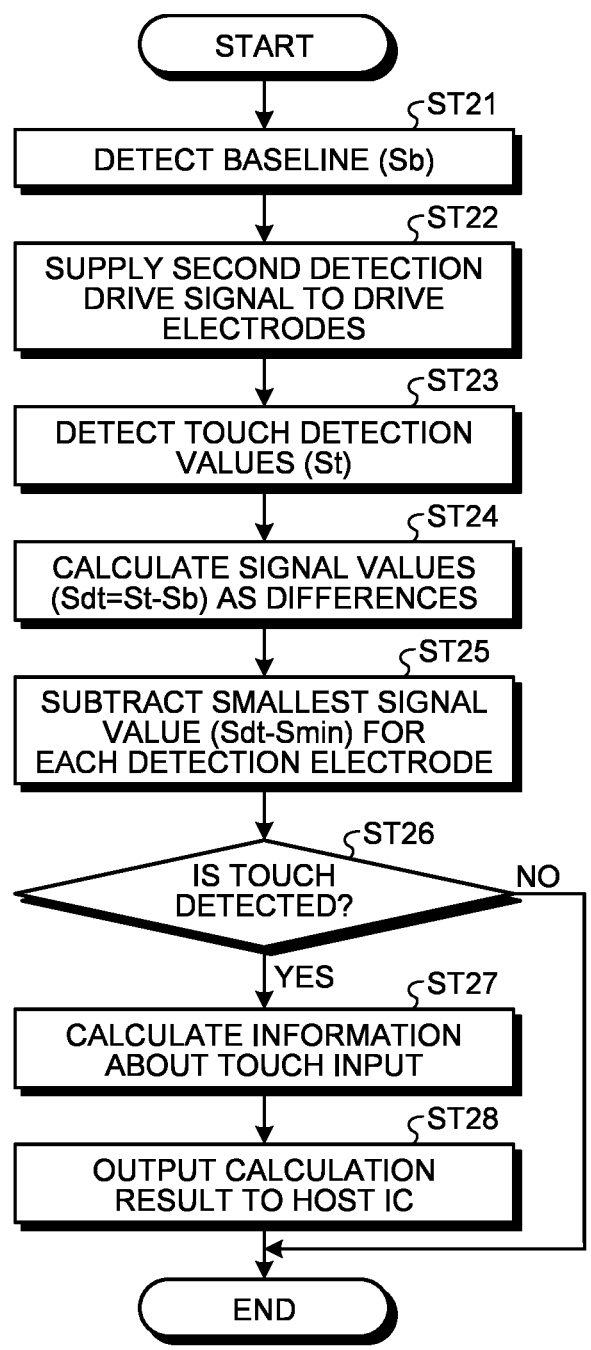
FIG. 16 is a flowchart for explaining a method for detecting a finger different from the input support device.

Next, detection (hereinafter, referred to as touch detection in some cases) of a finger different from the input support device 3 by the input detection system 1 will be described with reference to FIG. 16 to FIG. 19. FIG. 16 is a flowchart for explaining a method for detecting a detection target such as a part of the body of a user, including a part of the fingers or the palms, that is different from the input support device (hereinafter, explanation is made using the finger as a representative of the detection target).

As illustrated in FIG. 16, the detection IC 51 detects the baseline Sb at predetermined timing such as when the display device 2 is powered on (step ST21).

The drive electrode scan circuit 56 (refer to FIG. 9) supplies the second detection drive signal VD2 to the drive electrodes Tx in order (step ST22). The detection electrodes Rx output, to the detection IC 51, change in the mutual electrostatic capacitances between the drive electrodes Tx and the detection electrodes Rx as the detection signals Vdet. The detection IC 51 performs signal processing on the detection signals Vdet output from the detection electrodes Rx. The detection IC 51 then detects a plurality of touch detection values St based on the detection signals Vdet for one frame for respective positions SP (step ST23). The first detection drive signal VD1 may be employed instead of the second detection drive signal VD2 in the detection of the finger.

The first calculation circuit 71 (refer to FIG. 8) calculates signal values Sdt (St−Sb) as differences data between the touch detection values St and the baseline Sb (step ST24). The first calculation circuit 71 calculates the differences between the touch detection values St for one frame and the baseline Sb for one frame to calculate two-dimensional distribution of the signal values Sdt.

In the present embodiment, the drive electrode scan circuit 56 supplies the opposite phase signal xVD to the other drive electrodes Tx (drive electrodes Tx not to be driven) different from the drive electrode Tx to be driven. The detection signals Vdet (signal values Sdt) based on the opposite phase signal xVD are therefore detected even when the finger is not superimposed with the drive electrode Tx to be driven.

Figure 17:
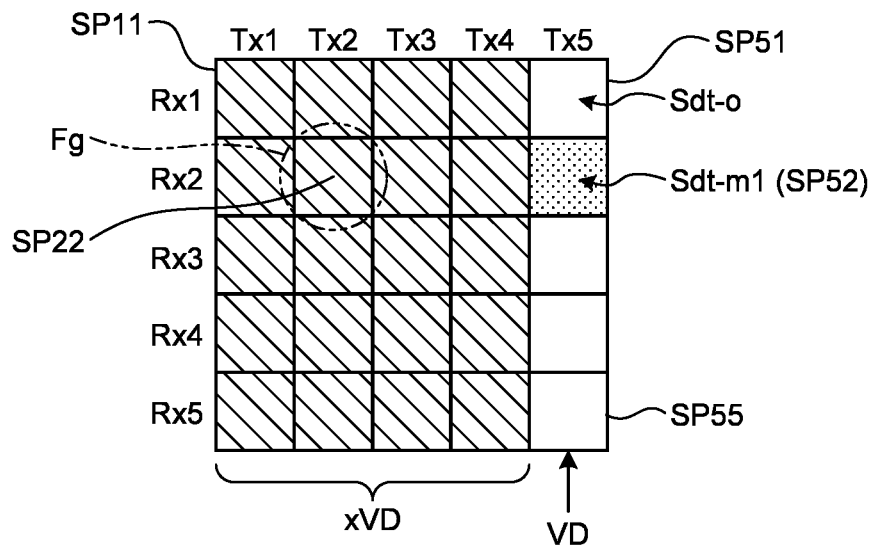
FIG. 17 is a descriptive view for explaining distribution of signal values when the detection drive signal is supplied to the drive electrode not superimposed with the finger.

FIG. 17 is a descriptive view for explaining distribution of signal values when the detection drive signal is supplied to the drive electrode not superimposed with the finger. FIG. 17 schematically illustrates two-dimensional distribution of the signal values Sdt when the finger is superimposed with the position SP22.

As illustrated in FIG. 17, the detection drive signal VD (second detection drive signal VD2) is supplied to the drive electrode Tx5 not superimposed with the finger. The opposite phase signal xVD is supplied to the other drive electrodes Tx1 to Tx4 including the drive electrode Tx2 superimposed with the finger. A negative polarity signal value Std-m1 is thereby detected at the position SP52 where the detection electrode Rx2 superimposed with the finger and the drive electrode Tx5 intersect with each other. This is because the detection electrode Rx2 detects capacitance change by the finger based on the opposite phase signal xVD since the finger is superimposed with the intersecting position SP22 between the detection electrode Rx2 and the drive electrode Tx2 to which the opposite phase signal xVD is supplied. A signal value Sdt-o with an intermediate potential is detected at the positions SP51, SP53, SP54, and SP55 where the detection electrodes Rx1, Rx3, Rx4, and Rx5 not superimposed with the finger and the drive electrode Tx5 intersect with each other.

Figure 18:
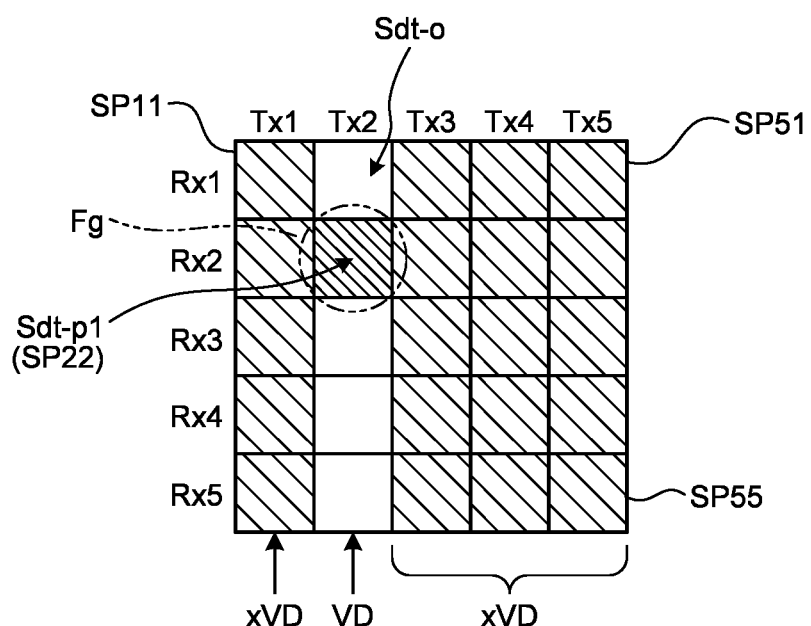
FIG. 18 is a descriptive view for explaining distribution of signal values when the detection drive signal is supplied to the drive electrode superimposed with the finger.

FIG. 18 is a descriptive view for explaining distribution of signal values when the detection drive signal is supplied to the drive electrode superimposed with the finger. As illustrated in FIG. 18, the detection drive signal VD (second detection drive signal VD2) is supplied to the drive electrode Tx2 superimposed with the finger. The opposite phase signal xVD is supplied to the drive electrodes Tx1, Tx3, Tx4, and Tx5 not superimposed with the finger. A positive polarity signal value Std-p1 is thereby detected at the position SP22 where the detection electrode Rx2 superimposed with the finger and the drive electrode Tx2 intersect with each other. The signal value Sdt-o with the intermediate potential is detected at the positions SP21, SP23, SP24, and SP25 where the detection electrodes Rx1, Rx3, Rx4, and Rx5 not superimposed with the finger and the drive electrode Tx2 intersect with each other.

With reference to FIG. 16 again, the first calculation circuit 71 (refer to FIG. 8) calculates the smallest signal value Smin among the signal values Sdt for each detection electrode Rx. The first calculation circuit 71 (refer to FIG. 8) performs subtraction (Sdt−Smin) with the smallest signal value Smin for each of the signal values Sdt for each detection electrode Rx (step ST25).

Figure 19:
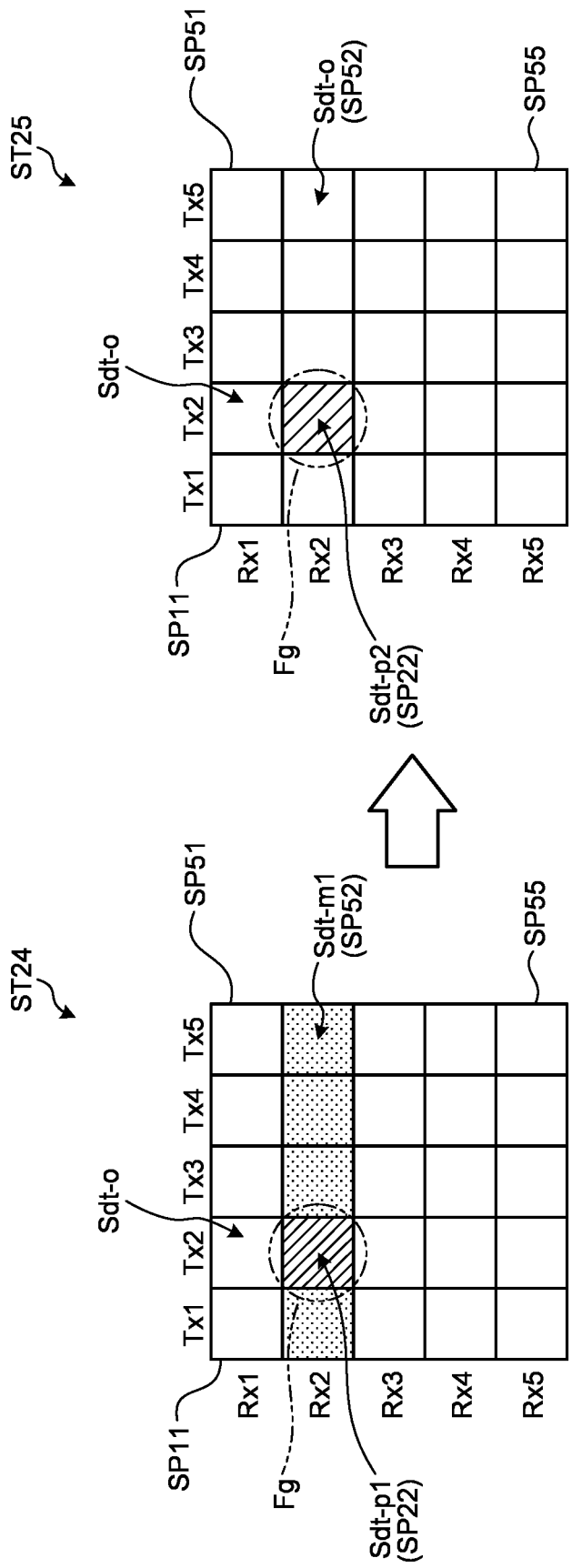
FIG. 19 is a descriptive view for explaining a method for subtraction with the smallest signal value for each detection electrode.

FIG. 19 is a descriptive view for explaining a method for subtraction with the smallest signal value for each detection electrode. A left view in FIG. 19 illustrates two-dimensional distribution of the signal values Sdt provided at step ST24. As illustrated in the left view in FIG. 19, the positive polarity signal value Std-p1 is detected at the position SP22 on the detection electrode Rx2 superimposed with a finger Fg based on the detection drive signal VD. The negative polarity signal value Std-m1 is detected at positions SP12, SP32, SP42, and SP52 based on the opposite phase signal xVD.

A right view in FIG. 19 illustrates two-dimensional distribution of the signal values Sdt after subtraction with the smallest signal value Smin (for example, the signal value Std-m1) provided at step ST25. As illustrated in the right view in FIG. 19, a positive polarity signal value Sdt-p2 (=(Std-p1)−(Std-m1)) is calculated at the position SP22 for the detection electrode Rx2 superimposed with the finger. The signal value Sdt-o (=(Std-m1)−(Std-m1)) is calculated at the positions SP12, SP32, SP42, and SP52.

Although FIG. 19 illustrates the example of subtraction at the positions SP corresponding to one detection electrode Rx2, the first calculation circuit 71 performs the subtraction processing for each of the detection electrodes Rx and calculates the two-dimensional distribution with the signal values Sdt after subtraction.

With the above-mentioned processing, the finger can be detected preferably even when the opposite phase signal xVD is supplied to the drive electrodes Tx not to be driven. The signal value Sdt (for example, the signal value Sdt-p2) at the position SP superimposed with the finger is increased by performing the subtraction processing for each detection electrode Rx. As a result, the input detection system 1 can improve the detection sensitivity of the finger.

With reference to FIG. 16 again, the determination circuit 73 (refer to FIG. 8) compares the signal values Sdt (Sdt−Smin) provided by subtraction with the threshold to determine whether touch is detected (step ST26). When the finger is detected (Yes at step ST26), the second calculation circuit 72 calculates information about touch input, such as the position coordinates of the finger (step ST27).

The second calculation circuit 72 outputs, to the host IC 100, the calculation result provided at step ST27, that is, the information about the touch input by the finger (step ST28). The host IC 100 outputs a control signal to the display IC 50 to perform display in accordance with the touch input operation.

When the finger is not detected (No at step ST26), the second calculation circuit 72 can omit the calculation at step ST27 and repeatedly executes the subsequent detection periods and display periods.

The above-mentioned method for detecting the finger is merely an example and can be appropriately changed. For example, although FIG. 16 illustrates the example where the drive electrode scan circuit 56 supplies the second detection drive signal VD2 having the non-resonant frequency, it may supply the first detection drive signal VD1 having the resonant frequency. In the left view in FIG. 19, the signal values Std-m1 at the positions SP12, SP32, SP42, and SP52 are assumed to be equal for the ease of explanation. Different signal values Sdt are however provided between the vicinities of the position SP22 and the position SP52 separated from the position SP22, in practice.

Figure 20:
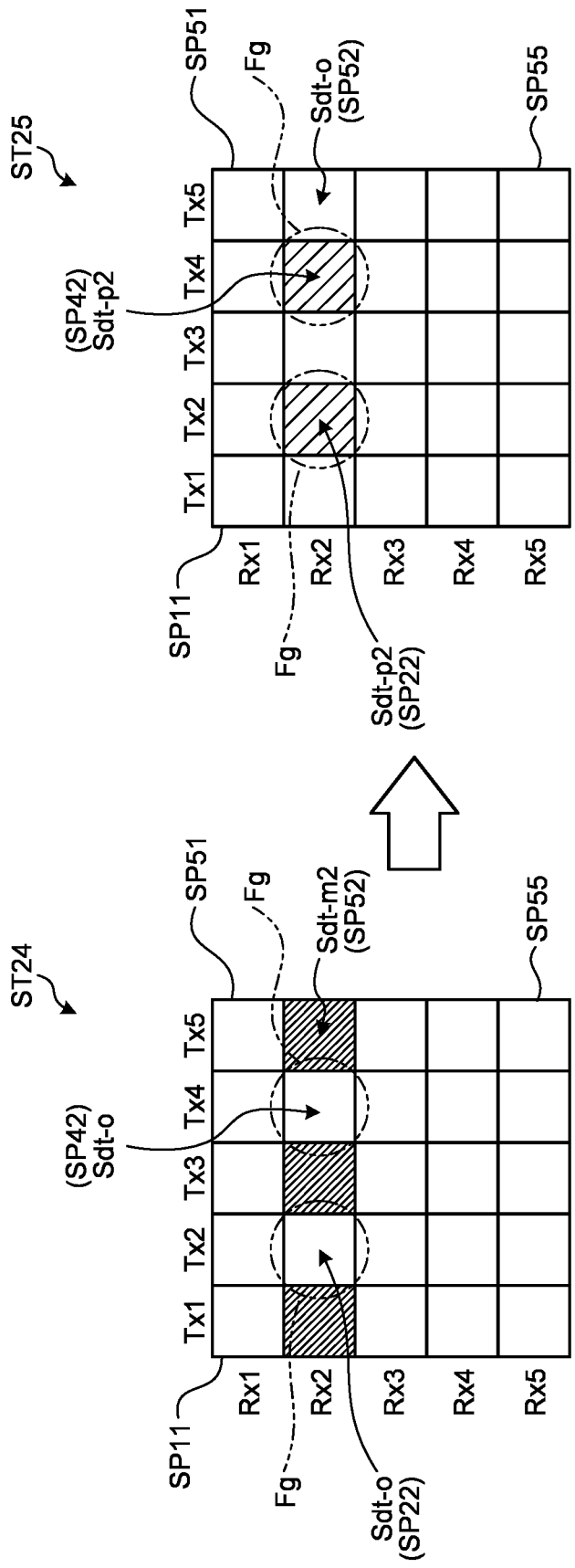
FIG. 20 is a descriptive view schematically illustrating a method for detecting multi-touch.

The touch detection with one finger has been explained with FIG. 17 to FIG. 19. Detection of so called multi-touch where a plurality of fingers come into contact with or close to different positions SP is also possible. FIG. 20 is a descriptive view schematically illustrating a method for detecting the multi-touch. As illustrated in a left view in FIG. 20, the fingers are superimposed with, for example, positions SP22 and SP42, respectively. When the detection drive signal VD is supplied to the drive electrode Tx2 and the opposite phase signal xVD having the opposite phase to that of the detection drive signal VD is supplied to the other drive electrodes Tx1 and Tx3 to Tx5, the negative polarity signal value Std-m1 at the position SP42 is added to the positive polarity signal value Std-p1 at the position SP22, so that the signal value Sdt-o provided by offset of these signal values is detected as the output of Rx2. The same holds true when the detection drive signal VD is supplied to the drive electrode Tx4.

At each of the positions SP12, SP32, and SP52 not superimposed with the finger, the negative polarity signal value Std-m1 detected based on the opposite phase signal xVD is added twice, so that a signal value Sdt-m2 is detected.

A right view in FIG. 20 illustrates two-dimensional distribution of the signal values Sdt after subtraction with the smallest signal value Smin (for example, the signal value Sdt-m2) provided at step ST25. As illustrated in the right view in FIG. 20, the positive polarity signal value Sdt-p2 (=(Sdt-o)−(Sdt-m2)) is calculated at the position SP22 and the position SP42 for the detection electrode Rx2 superimposed with the finger. The signal value Sdt-o (=(Sdt-m2)−(Sdt-m2)) is calculated at positions SP11, SP32, and SP52.

Also in detection of the so-called multi-touch, the signal value Sdt (for example, the signal value Sdt-p2) at the positions SP22 and SP42 superimposed with the fingers is increased by performing the subtraction processing for each detection electrode Rx. As a result, the input detection system 1 can improve the detection sensitivity of the finger.

Although the methods for detecting the input support device 3 and the finger have been individually explained for the sake of clarity in the flowcharts illustrated in FIG. 15 and FIG. 16, the presence or absence and the positions of both the input support device 3 and the finger on the display region (detection region) may be detected with one detection flow.

FIG. 21 is a flowchart for explaining a method for detecting the input support device and the finger. As illustrated in FIG. 21, the detection IC 51 detects the baseline Sb at predetermined timing such as when the display device 2 is powered on (step ST31).

Then, the drive electrode scan circuit 56 (refer to FIG. 9) supplies the first detection drive signal VD1 having the resonant frequency of the LC circuit 35 to the drive electrodes Tx in order (step ST32).

The detection electrodes Rx output, to the detection IC 51, change in the mutual electrostatic capacitances between the detection electrodes Rx and the drive electrodes Tx and signals generated by the resonance of the LC circuit 35 as the detection signals Vdet. The detection IC 51 detects the first detection values S1 based on the detection signals Vdet for one frame (step ST33).

The first calculation circuit 71 (refer to FIG. 8) calculates signal values Sd1 (S1−Sb) as differences between the first detection values S1 and the baseline Sb (step ST34). The first calculation circuit 71 calculates the differences between the first detection values S1 for one frame and the baseline Sb for one frame to calculate two-dimensional distribution of the signal values Sd1 as the differences.

The first calculation circuit 71 (refer to FIG. 8) calculates the smallest signal value Smin among the signal values Sd1 for each detection electrode Rx. The first calculation circuit 71 (refer to FIG. 8) performs subtraction (Sd1−Smin) with the smallest signal value Smin for each of the signal values Sd1 for each detection electrode Rx (step ST35).

The determination circuit 73 (refer to FIG. 8) compares the signal values Sd1 (Sd1−Smin) provided by the subtraction processing with the threshold to determine whether touch is detected (step ST36). When the finger is detected (Yes at step ST36), the second calculation circuit 72 calculates information about touch input, such as the position coordinates of the finger (step ST37). The configuration in which the process shifts to step ST39 from step ST35 while omitting the determination processing of the detection target such as the finger at steps ST36 to ST38 can also by employed.

The second calculation circuit 72 outputs, to the host IC 100, the calculation result provided at step ST37, that is, the information about the touch input by the finger (step ST38). The host IC 100 outputs a control signal to the display IC 50 to perform display in accordance with the touch input operation.

When the finger is not detected (No at step ST36), the second calculation circuit 72 can omit the calculation at step ST37 and executes subsequent detection at step ST39 and the following steps.

The drive electrode scan circuit 56 (refer to FIG. 9) supplies the second detection drive signal VD2 having the non-resonant frequency to the drive electrodes Tx in order (step ST39). The detection electrodes Rx output, to the detection IC 51, change in the mutual electrostatic capacitances between the drive electrodes Tx and the detection electrodes Rx as the detection signals Vdet. The detection IC 51 detects the second detection values S2 based on the detection signals Vdet for one frame (step ST40).

The first calculation circuit 71 (refer to FIG. 8) calculates signal values Sd2 (S1−S2) as differences between the first detection values S1 and the second detection values S2 (step ST41). The first calculation circuit 71 calculates the differences between the first detection values S1 for one frame and the second detection values S2 for one frame to calculate two-dimensional distribution of the signal values Sd2 as the differences.

The determination circuit 73 (refer to FIG. 8) compares the signal values Sd2 as the differences with the threshold to determine whether the input support device 3 is detected (step ST42). When the input support device 3 is detected (Yes at step ST42), the second calculation circuit 72 calculates information about input operation, such as the position coordinates and the rotation operation RT of the input support device 3, based on the two-dimensional distribution (detection pattern) of the signal values Sd2 as the differences (step ST43).

The second calculation circuit 72 outputs, to the host IC 100, a calculation result provided at step ST43, that is, the information about the input operation by the input support device 3 (step ST44). The host IC 100 outputs a control signal to the display IC 50 to perform display in accordance with the input operation.

When the input support device 3 is not detected (No at step ST42), the second calculation circuit 72 can omit the calculation at step ST43 and executes subsequent detection at ST45 and the following steps.

The first calculation circuit 71 (refer to FIG. 8) calculates signal values Sd3 (S2−Sb) as differences between the second detection values S2 provided at step ST40 and the baseline Sb (step ST45). The first calculation circuit 71 calculates the differences between the second detection values S2 for one frame and the baseline Sb for one frame to calculate two-dimensional distribution of the signal values Sd3 as the differences.

The first calculation circuit 71 (refer to FIG. 8) calculates the smallest signal value Smin among the signal values Sd3 for each detection electrode Rx. The first calculation circuit 71 (refer to FIG. 8) performs subtraction (Sd3−Smin) with the smallest signal value Smin for each of the signal values Sd3 for each detection electrode Rx (step ST46).

The determination circuit 73 (refer to FIG. 8) compares the signal values Sd3 (Sd3−Smin) provided by the subtraction processing with the threshold to determine whether touch is detected (step ST47). When the finger is detected (Yes at step ST47), the second calculation circuit 72 calculates information about touch input, such as the position coordinates of the finger (step ST48).

The second calculation circuit 72 outputs, to the host IC 100, a calculation result provided at step ST48, that is, the information about the touch input by the finger (step ST49). The host IC 100 outputs a control signal to the display IC 50 to perform display in accordance with the touch input operation.

When the determination circuit 73 does not detect the finger (No at step ST47), the second calculation circuit 72 can omit the calculation at step ST48 and repeatedly executes the subsequent detection periods and display periods.

The touch detection of the finger can be performed utilizing the first detection values S1 that are used for the detection of the input support device 3. Even when detection periods driven by the first detection drive signal VD1 and detection periods driven by the second detection drive signal VD2 having the different frequency from that of the first detection drive signal VD1 are provided, decrease in a report rate of the touch detection can be prevented.

As described above, the input detection system 1 in the present embodiment includes the input support device 3 including the LC circuit 35, the first electrode 31 coupled to one end side of the LC circuit 35, and the second electrode 32 coupled to the other end side of the LC circuit 35, and the display device 2 (detection device) including the drive electrodes Tx and the detection electrodes Rx arrayed in the display region DA (detection region) and the drive electrode scan circuit 56 configured to supply the detection drive signal VD (drive signal) to the drive electrodes Tx. The drive electrode scan circuit 56 supplies the detection drive signal VD (drive signal) to at least equal to or more than one drive electrode Tx and supplies, to the other drive electrodes Tx, the opposite phase signal xVD as the drive signal having the opposite phase to the detection drive signal VD (drive signal).

Second Embodiment

Figure 22:
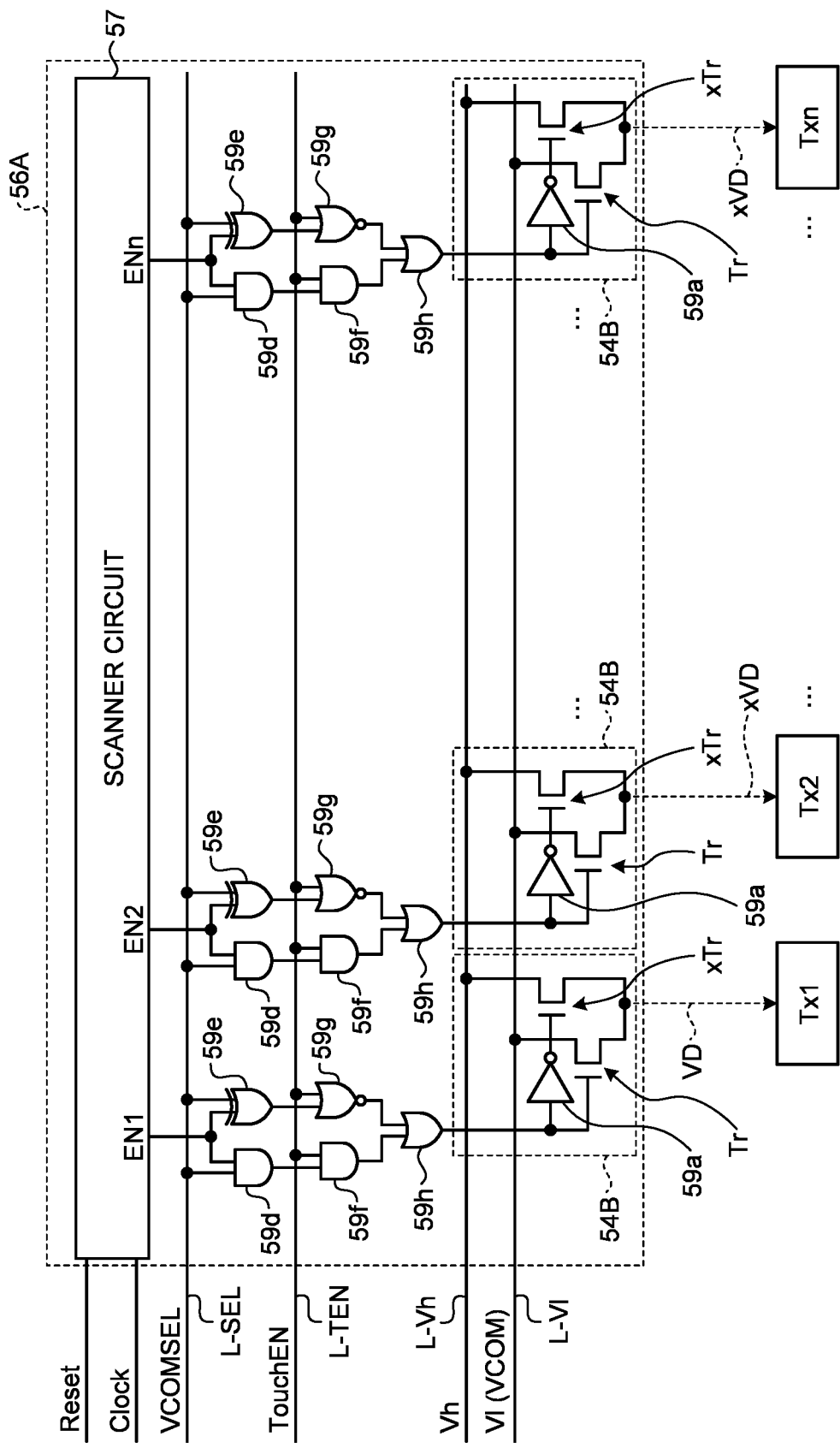
FIG. 22 is a circuit diagram illustrating an example of the configuration of a drive electrode scan circuit in an input detection system according to a second embodiment.

FIG. 22 is a circuit diagram illustrating an example of the configuration of a drive electrode scan circuit in an input detection system according to a second embodiment. The second embodiment differs from the first embodiment in the configuration in which a reference potential (for example, a ground potential GND) is supplied to the drive electrodes Tx not to be driven without supplying the opposite phase signal xVD thereto in touch detection of a finger. In the following explanation, the same reference numerals denote the same components described in the above-mentioned embodiment and repeated explanation thereof is omitted.

As illustrated in FIG. 22, a drive electrode scan circuit 56A in the second embodiment includes AND circuits 59d, XOR circuits 59e (exclusive-OR circuits), AND circuits 59f, NOR circuits 59g (negative-OR circuits), and OR circuits 59h between the scanner circuit 57 and the switch circuits 54B.

Each AND circuit 59d is a circuit configured to output AND of the control signal EN supplied from the scanner circuit 57 and the control signal VCOMSEL supplied through the control signal supply wiring L-SEL.

Each XOR circuit 59e is a circuit configured to output exclusive OR of the control signal EN supplied from the scanner circuit 57 and the control signal VCOMSEL supplied through the control signal supply wiring L-SEL.

Each AND circuit 59f is a circuit configured to output AND of a signal supplied from the AND circuit 59d at an upper stage and a control signal TouchEN supplied through touch detection control signal supply wiring L-TEN.

Each NOR circuit 59g is a circuit configured to output negative OR of a signal supplied from the XOR circuit 59e at an upper stage and the control signal TouchEN supplied through the touch detection control signal supply wiring L-TEN.

Each OR circuit 59h is a circuit configured to output OR of a signal supplied from the AND circuit 59f and a signal supplied from the NOR circuit 59g. The OR circuit 59h is coupled to the switch circuit 54B, and an output signal of the OR circuit 59h is supplied to the switch circuit 54B. The configuration and operation of the switch circuit 54B is similar to those in the above-mentioned first embodiment.

FIG. 23 is a table illustrating a relation between various control signals that are supplied to the drive electrode scan circuit and an output signal of the switch circuit in the input detection system in the second embodiment. As illustrated in Table 2 in FIG. 23, when the control signal TouchEN is at an L level, a relation between the control signal EN and the control signal VCOMSEL and the output Vout from the switch circuit 54B is similar to that in the first embodiment (refer to Table 1 in FIG. 10). In other words, when the control signal TouchEN is at the L level, the input support device 3 is detected.

When the control signal TouchEN is at an H level, the control signal EN is at an H level, and the control signal VCOMSEL is at an H level, the output Vout from the switch circuit 54B is the first voltage signal Vh. When the control signal TouchEN is at the H level, the control signal EN is at the H level, and the control signal VCOMSEL is at an L level, the output Vout from the switch circuit 54B is the second voltage signal Vl. That is to say, when the control signal TouchEN is at the H level and the control signal EN is at the H level, the detection drive signal VD having the same phase as that of the control signal VCOMSEL is supplied to the drive electrode Tx.

When the control signal TouchEN is at the H level, the control signal EN is at the L level, and the control signal VCOMSEL is at the H level and when the control signal TouchEN is at the H level, the control signal EN is at the L level, and the control signal VCOMSEL is at the L level, the output Vout from the switch circuit 54B is the second voltage signal Vl. In other words, when the control signal TouchEN is at the H level and the control signal EN is at the L level, the second voltage signal Vl (display drive signal VCOM) is supplied to the drive electrodes Tx not to be driven regardless of the control signal VCOMSEL.

Figure 24:
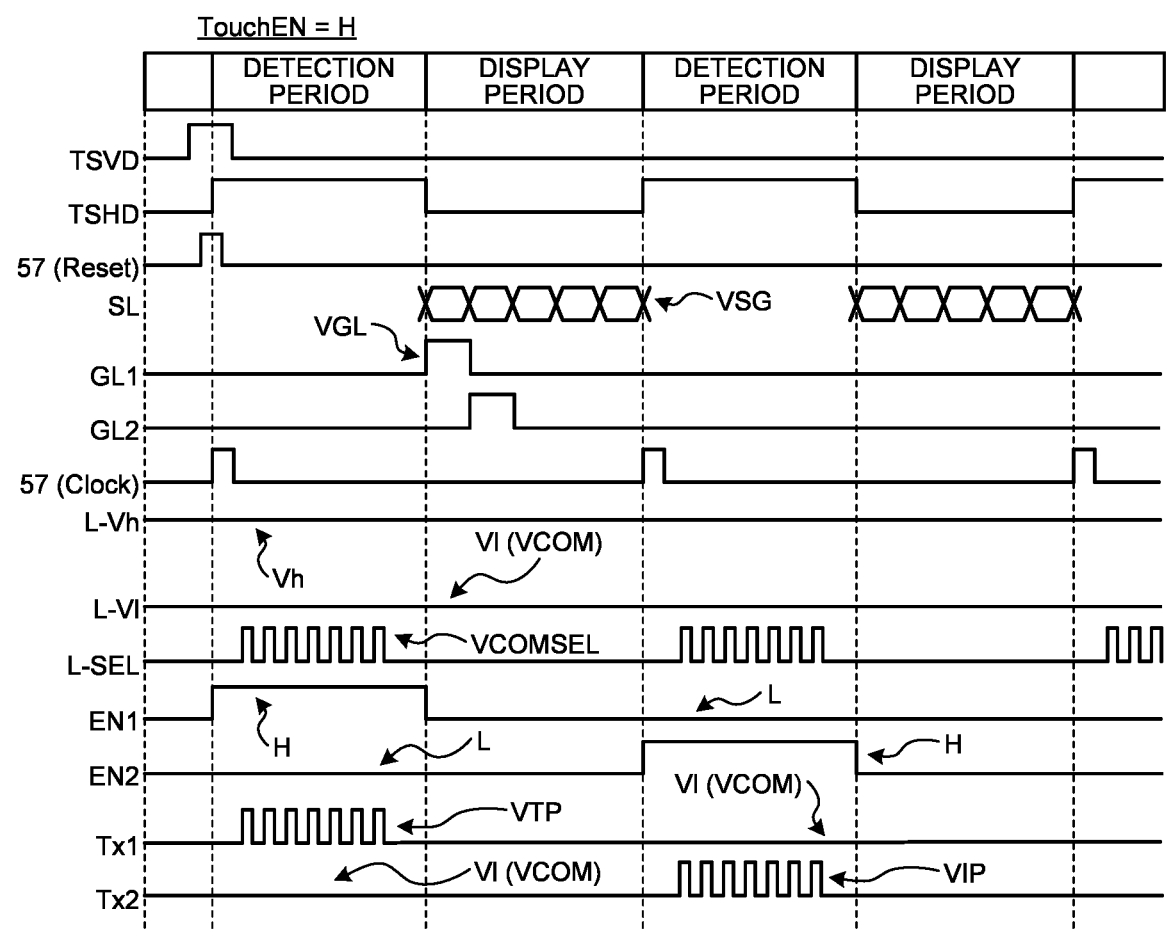
FIG. 24 is a timing waveform chart for explaining display periods and detection periods in the input detection system in the second embodiment.

FIG. 24 is a timing waveform chart for explaining display periods and detection periods in the input detection system in the second embodiment. FIG. 24 illustrates the case in which the control signal TouchEN is at the H level, that is, the detection periods for touch detection and the display periods. The timing waveform chart in the case in which the control signal TouchEN is at the L level, that is, the detection periods for detection of the input support device 3 is similar to that in the above-mentioned first embodiment (refer to FIG. 11).

As illustrated in FIG. 24, the scanner circuit 57 outputs the H-level control signals EN1, EN2, . . . , and ENn for scanning in order for the respective detection periods. The drive electrodes Tx to be driven are selected in a time division manner in accordance with the H-level control signals EN1, EN2, . . . , and ENn. The display IC 50 supplies the control signal VCOMSEL of alternate rectangular waves to the control signal supply wiring L-SEL in the detection periods. The detection drive signal VD having the same phase as that of the control signal VCOMSEL is thereby supplied to the drive electrodes Tx to be driven. The second voltage signal Vl (display drive signal VCOM) is supplied to the other drive electrode Tx (drive electrodes Tx not to be driven) different from the drive electrode Tx to be driven based on the L-level control signal EN.

In the second embodiment, since the opposite phase signal xVD is not supplied in touch detection of the finger, a conventional method for calculating touch detection can be employed. That is to say, calculation such as the subtraction processing at step ST25 can be omitted in the flowchart of the touch detection illustrated in FIG. 16.

The scanner circuit 57 outputs the L-level control signals EN1, EN2, . . . , and ENn in the display periods. The display IC 50 supplies the L-level control signal VCOMSEL to the control signal supply wiring L-SEL in the display periods. As illustrated in Table 2 in FIG. 23, the second voltage signal Vl (display drive signal VCOM) is supplied to all the drive electrodes Tx. The drive electrodes Tx thereby function as the common electrodes in the display periods.

As described above, in the display device 2 (detection device) in the second embodiment, the drive electrode scan circuit 56A supplies the drive signal VD to at least equal to or more than one drive electrode Tx and supplies the opposite phase signal xVD to the other drive electrodes Tx in a first detection period where the input support device 3 is detected. The drive signal VD is supplied to at least equal to or more than one drive electrode Tx and the second voltage signal Vl as the fixed potential is supplied to the other drive electrodes in a second detection period where the detection target different from the input support device 3 is detected.

Third Embodiment

Figure 25:
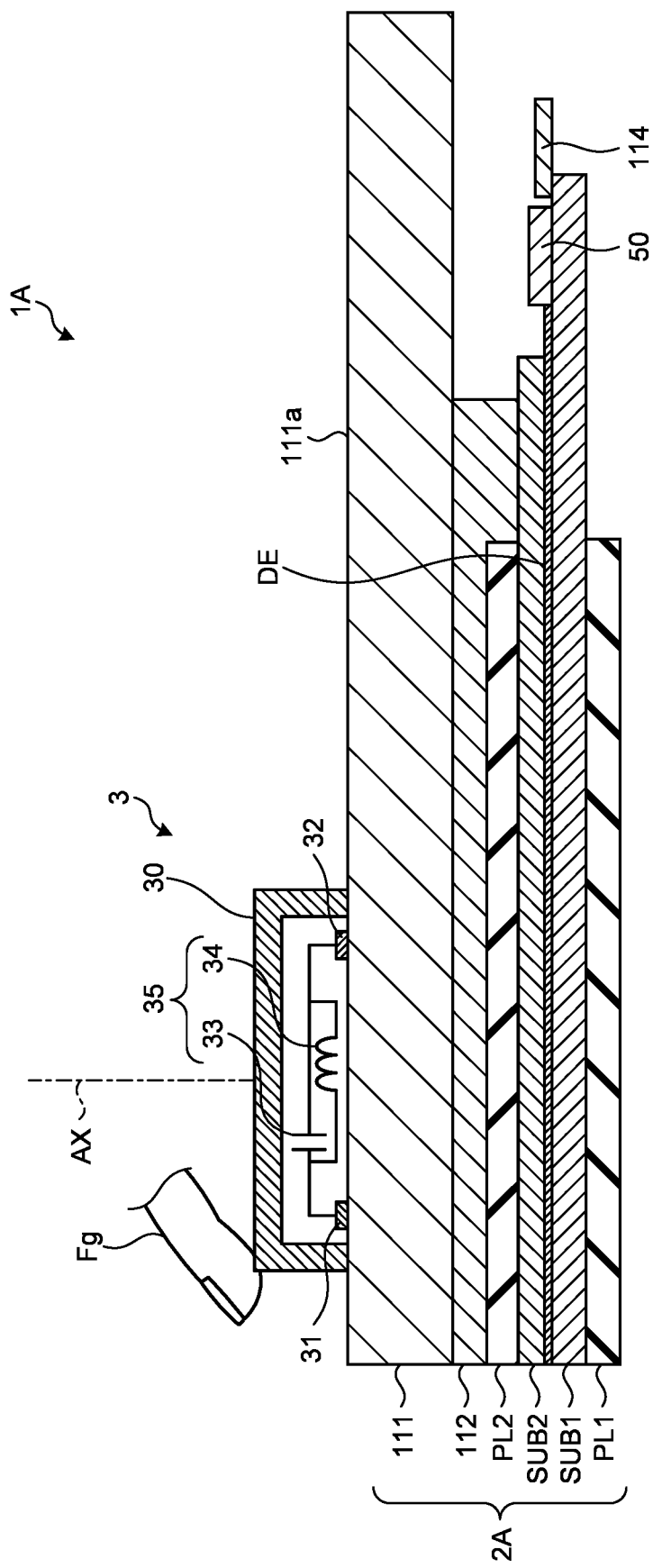
FIG. 25 is a cross-sectional view illustrating a schematic cross-sectional structure of an input detection system according to a third embodiment.

FIG. 25 is a cross-sectional view illustrating a schematic cross-sectional structure of an input detection system according to a third embodiment. The above-mentioned first embodiment and second embodiment have described the example in which the input support device 3 is arranged above the display device 2 including the mutual electrostatic capacitance-type touch sensor with the drive electrodes Tx and the detection electrodes Rx. The configuration is however not limited thereto. The touch sensor (display device 2) may be of a self-electrostatic capacitance type (self-type).

In an input detection system 1A in the third embodiment, as illustrated in FIG. 25, a display device 2A includes a plurality of detection electrodes DE provided above the array substrate SUB1. The detection electrodes DE serve as common electrodes in display and as the drive electrodes Tx and the detection electrodes Rx for detecting the input support device 3 and a finger. In the third embodiment, the detection electrodes Rx, the detection IC 51, and the wiring substrate 115 (refer to FIG. 2) are not provided on the counter substrate SUB2 unlike the first embodiment.

Figure 26:
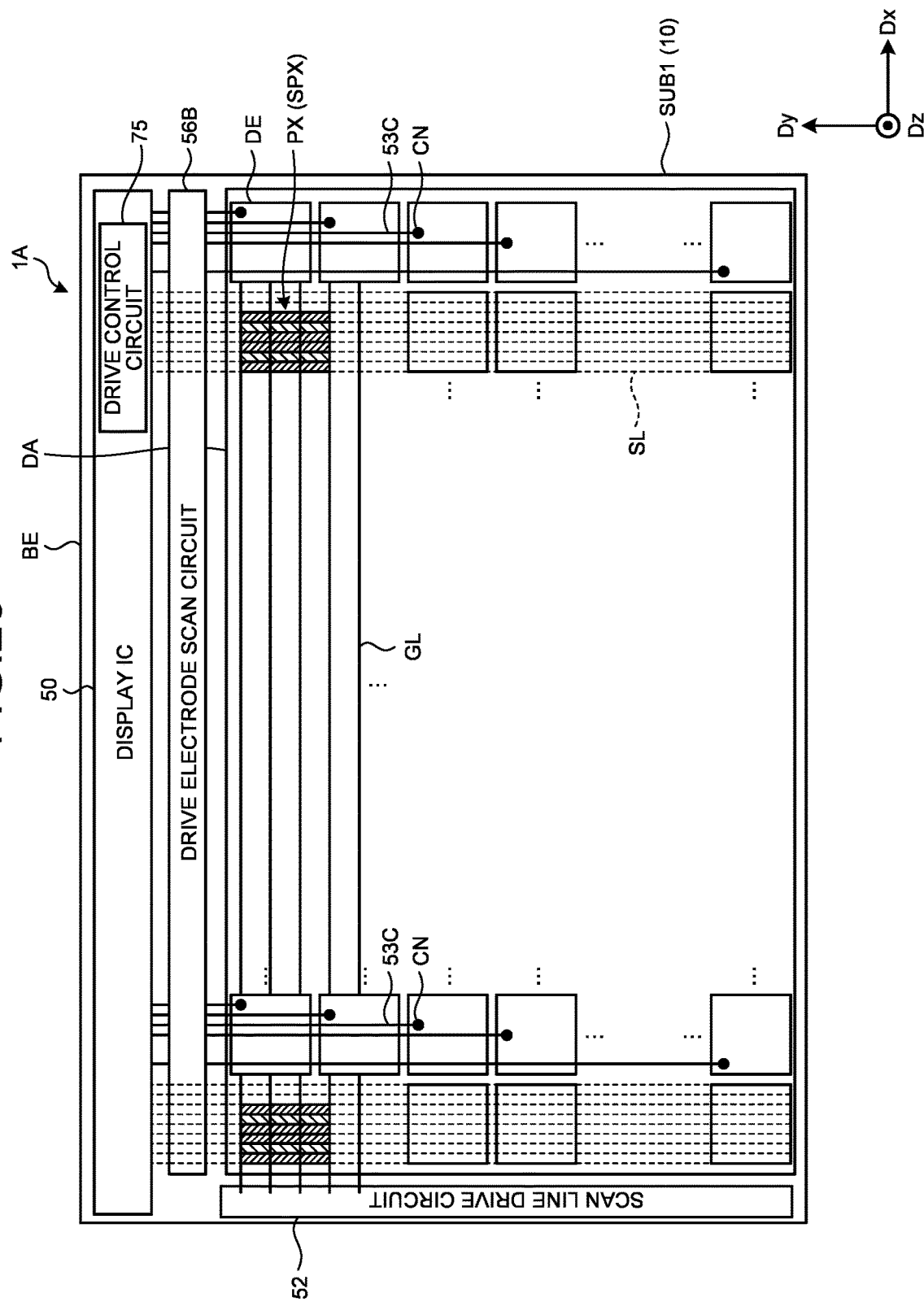
FIG. 26 is a plan view schematically illustrating an array substrate of the input detection system in the third embodiment.

FIG. 26 is a plan view schematically illustrating the array substrate of the input detection system in the third embodiment. As illustrated in FIG. 26, the detection electrodes DE are arrayed in a matrix with a row-column configuration in the display region DA of the array substrate SUB1. Wiring lines 53C are provided so as to correspond to the respective detection electrodes DE and are coupled to the detection electrodes DE through contact holes CN. Each of the wiring lines 53C extends along the second direction Dy and is aligned in the first direction Dx. The wiring lines 53C are coupled to a drive electrode scan circuit 56B and the display IC 50 provided in the peripheral region BE. The pixel signal lines SL are coupled to the display IC 50 provided in the peripheral region BE.

In the present embodiment, the display IC 50 has the functions of the circuits included in the detection IC 51 illustrated in FIG. 8. The configuration is however not limited thereto, and the detection IC 51 may be provided separately from the display IC 50 as in the first embodiment.

The drive electrode scan circuit 56B supplies the display drive signal VCOM (second voltage signal Vl) to the detection electrodes DE simultaneously in a display period. The drive electrode scan circuit 56B supplies the detection drive signal VD to at least equal to or more than one detection electrode DE in a detection period. The detection electrodes DE output the detection signals Vdet based on change in the self-capacitances to the detection circuit 76 (refer to FIG. 9) that the display IC 50 includes. The display IC 50 thereby detects the finger or the input support device 3.

More specifically, in touch detection where the finger is detected, the display IC 50 and the drive electrode scan circuit 56B supply the detection drive signal VD to the detection electrodes DE simultaneously. In detection of the input support device 3, the display IC 50 and the drive electrode scan circuit 56B supply the detection drive signal VD to at least equal to or more than one of the detection electrodes DE and supply the opposite phase signal xVD to the other detection electrodes DE. The drive electrode scan circuit 56B may scan the detection electrodes DE to be driven in order one by one or may scan the detection electrodes DE in order row by row or column by column. The display IC 50 detects the position and the like of the input support device 3 utilizing change in the self-capacitances of the detection electrodes DE and resonance of the LC circuit 35 of the input support device 3.

Although the preferred embodiments of the present disclosure have been described above, the present disclosure is not limited by these embodiments. Contents disclosed in the embodiments are merely examples, and various modifications can be made in a scope without departing from the gist of the present disclosure. Appropriate modifications in a scope without departing from the gist of the present disclosure naturally belong to the technical scope of the present disclosure. At least one of various omission, replacement, and modification of the components can be performed in a scope without departing from the gist of the embodiments and modifications described above.

What is claimed is:

1. An input detection system comprising:
   a detection device including a plurality of drive electrodes and a plurality of detection electrodes arrayed in a detection region, and a drive electrode scan circuit configured to supply a drive signal to the drive electrodes;
   an input device including an LC circuit, a first electrode coupled to one end side of the LC circuit, and a second electrode coupled to the other end side of the LC circuit; and
   a control circuit configured to detect a detection target based on detection signals output from the detection electrodes, wherein
   the drive electrode scan circuit supplies the drive signal to at least equal to or more than one of the drive electrodes and supplies, to the others of the drive electrodes, an opposite phase signal as a drive signal having an opposite phase to a phase of the drive signal, and
   the control circuit detects the input device based on signal values as differences between a plurality of first detection values that are detected when a first drive signal having a resonant frequency of the LC circuit is supplied to at least equal to or more than one of the drive electrodes and a plurality of second detection values that are detected when a second drive signal having a non-resonant frequency different from the resonant frequency is supplied to at least equal to or more than one of the drive electrodes.

2. The input detection system according to claim 1, wherein
   the drive signal is supplied to the drive electrode corresponding to one of the first electrode and the second electrode, and the opposite phase signal is supplied to the drive electrode corresponding to the other of the first electrode and the second electrode.

3. The input detection system according to claim 1, wherein
each of the drive signal and the opposite phase signal has a waveform in which a first voltage signal and a second voltage signal different from the first voltage signal are alternately repeated,
the drive signal has the first voltage signal and the opposite phase signal has the second voltage signal in a first period, and
the drive signal has the second voltage signal and the opposite phase signal has the first voltage signal in a second period.

4. An input detection system comprising:
a detection device including a plurality of drive electrodes and a plurality of detection electrodes arrayed in a detection region, and a drive electrode scan circuit configured to supply a drive signal to the drive electrodes;
an input device including an LC circuit, a first electrode coupled to one end side of the LC circuit, and a second electrode coupled to the other end side of the LC circuit; and
a control circuit configured to detect a detection target based on detection signals output from the detection electrodes, wherein
the drive electrode scan circuit supplies the drive signal to at least equal to or more than one of the drive electrodes and supplies, to the others of the drive electrodes, an opposite phase signal as a drive signal having an opposite phase to a phase of the drive signal,
the control circuit calculates signal values of the detection signals for respective positions where the drive electrodes and the detection electrodes intersect with each other, and
the control circuit calculates a smallest signal value among the signal values and subtracts the smallest signal value from each of the signal values for each of the detection electrodes in detection of the detection target different from the input device.

5. The input detection system according to claim 4, wherein
the drive signal is supplied to the drive electrode corresponding to one of the first electrode and the second electrode, and
the opposite phase signal is supplied to the drive electrode corresponding to the other of the first electrode and the second electrode.

6. The input detection system according to claim 4, wherein
each of the drive signal and the opposite phase signal has a waveform in which a first voltage signal and a second voltage signal different from the first voltage signal are alternately repeated,
the drive signal has the first voltage signal and the opposite phase signal has the second voltage signal in a first period, and
the drive signal has the second voltage signal and the opposite phase signal has the first voltage signal in a second period.

7. An input detection system comprising:
a detection device including a plurality of drive electrodes and a plurality of detection electrodes arrayed in a detection region, and a drive electrode scan circuit configured to supply a drive signal to the drive electrodes; and
an input device including an LC circuit, a first electrode coupled to one end side of the LC circuit, and a second electrode coupled to the other end side of the LC circuit, wherein
the drive electrode scan circuit supplies the drive signal to at least equal to or more than one of the drive electrodes and supplies, to the others of the drive electrodes, an opposite phase signal as a drive signal having an opposite phase to a phase of the drive signal,
the drive electrode scan circuit supplies the drive signal to at least equal to or more than one of the drive electrodes and supplies the opposite phase signal to the others of the drive electrodes in a first detection period where the input device is detected, and
the drive electrode scan circuit supplies the drive signal to at least equal to or more than one of the drive electrodes and supplies a signal with a fixed potential to the others of the drive electrodes in a second detection period where a detection target different from the input device is detected.

8. The input detection system according to claim 7, wherein
the drive signal is supplied to the drive electrode corresponding to one of the first electrode and the second electrode, and
the opposite phase signal is supplied to the drive electrode corresponding to the other of the first electrode and the second electrode.

9. The input detection system according to claim 7, wherein
each of the drive signal and the opposite phase signal has a waveform in which a first voltage signal and a second voltage signal different from the first voltage signal are alternately repeated,
the drive signal has the first voltage signal and the opposite phase signal has the second voltage signal in a first period, and
the drive signal has the second voltage signal and the opposite phase signal has the first voltage signal in a second period.

* * * * *